US012761068B2

(12) United States Patent
Lin et al.

(10) Patent No.: US 12,761,068 B2
(45) Date of Patent: Oct. 13, 2026

(54) METHOD FOR IDENTIFYING SPATIAL-TEMPORAL LOAD DISTRIBUTION OF BRIDGE GROUP BASED ON MULTI-SOURCE DATA FUSION

(71) Applicant: SHENZHEN URBAN TRANSPORT PLANNING CENTER CO., LTD., Shenzhen (CN)

(72) Inventors: Tao Lin, Shenzhen (CN); Xiaochun Zhang, Shenzhen (CN); Xing Liu, Shenzhen (CN); Anxin Meng, Shenzhen (CN); Ziyi Zhou, Shenzhen (CN); Zhenwu Chen, Shenzhen (CN); Jinqing Qin, Shenzhen (CN)

(73) Assignee: SHENZHEN URBAN TRANSPORT PLANNING CENTER CO., LTD., Shenzhen (CN)

( * ) Notice: Subject to any disclaimer, the term of this patent is extended or adjusted under 35 U.S.C. 154(b) by 65 days.

(21) Appl. No.: 18/950,198

(22) Filed: Nov. 18, 2024

(65) Prior Publication Data

US 2025/0207969 A1 Jun. 26, 2025

Related U.S. Application Data

(63) Continuation of application No. PCT/CN2024/111200, filed on Aug. 9, 2024.

(30) Foreign Application Priority Data

Dec. 26, 2023 (CN) ........................ 202311799793.3

(51) Int. Cl.

*G01G 19/414* (2006.01)
*G01S 19/14* (2010.01)

(52) U.S. Cl.

CPC ........... *G01G 19/414* (2013.01); *G01S 19/14* (2013.01)

(58) Field of Classification Search

CPC .............................. G01G 19/414; G01S 19/14
See application file for complete search history.

(56) References Cited

U.S. PATENT DOCUMENTS

2021/0381911 A1* 12/2021 Ye ........................... G06N 3/08

FOREIGN PATENT DOCUMENTS

AU 2020102912 A4 12/2020
CN 108914815 A 11/2018

(Continued)

*Primary Examiner* — Scott A Browne
*Assistant Examiner* — Josephine Rich

(57) ABSTRACT

The present application discloses a method for identifying the spatial-temporal load distribution of a bridge group based on multi-source data fusion, and belongs to the technical field of bridge group load distribution identification. Based on the vehicle correlation and time correlation between vehicle positioning data and vehicle load detection data and combining the characteristics of the vehicle load being unchanged within a certain period of time, the present application takes a vehicle load detection point as a node, divides a vehicle trajectory into a plurality of load segments, obtains the load segment where the bridge is located, and simultaneously performs correlation matching on the vehicle positioning data and the vehicle load detection point data in the load segment where the bridge is located according to the vehicle ID and the vehicle load point detection time to obtain the actual load data when the vehicle passes through the bridge.

7 Claims, 1 Drawing Sheet

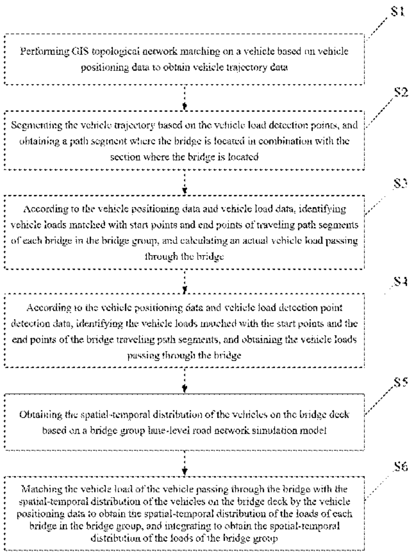

(56) References Cited

FOREIGN PATENT DOCUMENTS

| | | | |
|---|---|---|---|
| CN | 117036299 | A | 11/2023 |
| CN | 117058600 | A | 11/2023 |
| CN | 117454318 | A | 1/2024 |

* cited by examiner

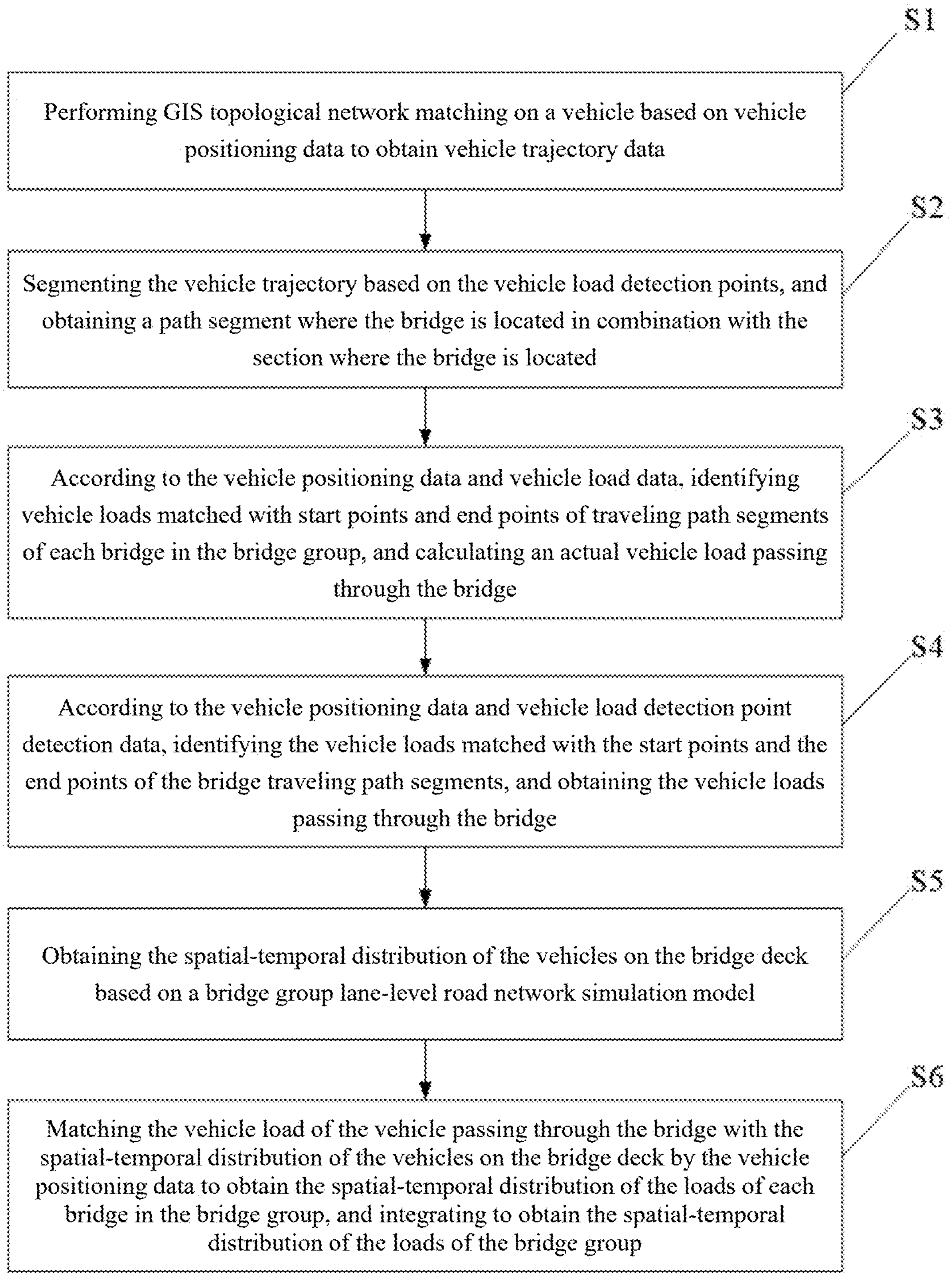
S1
Performing GIS topological network matching on a vehicle based on vehicle positioning data to obtain vehicle trajectory data
S2
Segmenting the vehicle trajectory based on the vehicle load detection points, and obtaining a path segment where the bridge is located in combination with the section where the bridge is located
S3
According to the vehicle positioning data and vehicle load data, identifying vehicle loads matched with start points and end points of traveling path segments of each bridge in the bridge group, and calculating an actual vehicle load passing through the bridge
S4
According to the vehicle positioning data and vehicle load detection point detection data, identifying the vehicle loads matched with the start points and the end points of the bridge traveling path segments, and obtaining the vehicle loads passing through the bridge
S5
Obtaining the spatial-temporal distribution of the vehicles on the bridge deck based on a bridge group lane-level road network simulation model
S6
Matching the vehicle load of the vehicle passing through the bridge with the spatial-temporal distribution of the vehicles on the bridge deck by the vehicle positioning data to obtain the spatial-temporal distribution of the loads of each bridge in the bridge group, and integrating to obtain the spatial-temporal distribution of the loads of the bridge group

METHOD FOR IDENTIFYING SPATIAL-TEMPORAL LOAD DISTRIBUTION OF BRIDGE GROUP BASED ON MULTI-SOURCE DATA FUSION

TECHNICAL FIELD

The present application relates to a method for identifying the spatial-temporal load distribution of a bridge group, and in particular to a method for identifying the spatial-temporal load distribution of a bridge group based on multi-source data fusion, and belongs to the technical field of bridge group load distribution identification.

BACKGROUND

Vehicle load is the main external load borne by road and bridge structures. Under the influence of travel demands, environment, traffic control and the boundary of the bridge, there is great uncertainty in the vehicles passing on the bridge. In addition, due to the differences in vehicle models, vehicle weights, axle weights and vehicle speeds on the bridge, it is more difficult to obtain the vehicle load distribution on the bridge. Inaccurate vehicle load distribution leads to inconsistency between the vehicle load model and the actual load borne by the bridge, and the uncertainty of load input makes it difficult to assess the safety status of the bridge according to the structural response monitoring data. Therefore, obtaining the accurate spatial-temporal distribution of loads on the bridge is of great significance for constructing a bridge vehicle load distribution model and studying the inter-feedback evolution of bridge performance and traffic loads.

At present, there are two main bridge vehicle load detection technologies. According to one of the technologies, based on a dynamic weighing system, the weights and the speeds of the vehicles passing through the bridge deck are accurately measured, a bridge deck vehicle load probability distribution model is obtained through a statistical analysis method, or the space distribution of the vehicles is obtained through an image method by arranging a plurality of cameras on the bridge deck; however, this technology can only be used for the bridge deck load distribution of a single bridge, which is high in cost, time-consuming and complex in operation. According to the other technology, based on the structural response data of a monitoring system and a vehicle-bridge coupling model, the vehicle load is identified by an influence line method, a machine learning method and other methods; however, the actual application requires the installation of a structural health monitoring system, which is high in cost, time-consuming and complex in operation.

In the prior art, Patent Application Publication No. CN108914815B discloses a bridge deck vehicle load identification device, a bridge and a bridge load distribution identification method. A radar tracking and positioning system includes at least one radar group, the radar group includes three radars, the radars are arranged on the bridge to collect first-type vehicle data, and dynamic weighing systems are arranged at intervals on the bridge deck to collect second-type vehicle data. A data processing device obtains the first-type vehicle data and the second-type vehicle data, and the data processing device calculates a vehicle driving trajectory associated with time according to clock information and the first-type vehicle data, and obtains a spatial distribution of vehicle loads on the bridge deck by combining the second-type vehicle data and the vehicle driving trajectory associated with time, so as to obtain the spatial distribution of the vehicle loads on the bridge deck at any moment. However, this method is not suitable for bridges without radar equipment, video equipment and dynamic weighing systems. Patent Application Publication No. CN111709332B discloses a method for identifying spatial-temporal distribution of vehicle loads on a bridge based on DenseNet. The method includes the following steps: mounting a plurality of cameras in different positions of a bridge, collecting images of the bridge from different directions, and outputting video images with time tags; collecting multichannel characteristics of vehicles on the bridge by using DenseNet, including color characteristics, shape characteristics and position characteristics; analyzing the data and characteristics of the vehicles from different cameras at a same moment to obtain vehicle distribution on the bridge at any time; and collecting vehicle loads of the vehicles passing through the bridge by combining a dynamic weighing system, and achieving the spatial-temporal distribution identification of the vehicle loads on the bridge deck. However, this method requires the mounting of a plurality of cameras on the bridge and requires a video identification algorithm for identification, which has large operation difficulty, high cost and large computational power demand. At the same time, this method is difficult to identify the vehicle load distribution at night, while most heavy-duty vehicles often travel at night.

In summary, a bridge group load distribution identification method capable of obtaining vehicle loads throughout the day, requiring no additional equipment and being applied in a large scale is needed.

SUMMARY

The following presents a simplified summary of the present application to provide a basic understanding of some aspects of the present application. It should be understood that this summary is not an exhaustive overview of the present application. It is not intended to determine key or important parts of the present application, nor is it intended to limit the scope of the present application. The purpose of this summary is only to present some concepts in a simplified form as a prelude to the more detailed description discussed later.

In view of this, to solve the problems in the prior art that the traditional bridge group load distribution identification method requires additional equipment and is difficult to identify the spatial-temporal distribution of vehicles on the bridge deck at night, the present application provides a method for identifying the spatial-temporal load distribution of a bridge group based on multi-source data fusion.

The technical solution is as follows: a method for identifying the spatial-temporal load distribution of a bridge group based on multi-source data fusion includes the following steps:

S1. performing GIS topological network matching on a vehicle based on vehicle positioning data to obtain vehicle trajectory data;

S11. selecting vehicle load detection points in an area, and extracting and collecting vehicle load detection data and vehicle positioning data; wherein specifically, the vehicle load detection points include an overload control point, a source overload control detection point, a high-speed weight toll detection point and a bridge dynamic weighing detection point, vehicle load detection data and vehicle positioning data in the same selected time are selected in a selected area, the vehicle load detection data, i.e., the collected vehicle load detection point information, includes a license plate number, detection time, a vehicle load and an ID, a longitude and a latitude of a section where the vehicle load is located, and the vehicle positioning data include a vehicle length, a vehicle model, a vehicle type, a license plate number, time, a driving speed and longitude and latitude coordinates;

S12. preprocessing the vehicle positioning data, and collecting GIS topological network section information of a road network;

S13. collecting bridge group information, and matching the vehicle positioning data with the GIS topological network section information;

S14. according to the GIS topological network section information, obtaining vehicle positioning data matched with bridge traveling sections in the bridge group to form vehicle trajectory data;

S2. segmenting the vehicle trajectory based on the vehicle load detection points, and obtaining a path segment where the bridge is located in combination with the section where the bridge is located;

S21. dividing all vehicle trajectories into a plurality of path subsegments according to the ID of the section where the vehicle load detection points are located;

S22. extracting path subsegments where bridge travelings of each bridge in the bridge group are located according to a section where the bridge traveling in bridge group information is located;

S3. according to the vehicle positioning data and vehicle load data, identifying vehicle loads matched with start points and end points of traveling path segments of each bridge in the bridge group, and calculating an actual vehicle load passing through the bridge;

S31. respectively identifying a start point vehicle load detection point and an end point vehicle load detection point corresponding to a vehicle entering segment and a vehicle exiting segment of each path subsegment of vehicle load segment sets matched with bridge travelings, and calculating detection time and vehicle load passing through the two points;

S32. selecting a specific vehicle load detection point, and calculating predicted time of the specific vehicle load detection point, predicted time of the vehicle passing through the start point vehicle load detection point and predicted time of the vehicle passing through the end point vehicle load detection point based on the vehicle positioning data;

S33. matching the vehicle positioning data with vehicle load data of a segment from the start point vehicle load detection point to the end point vehicle load detection point, i.e., a load segment, and obtaining the actual vehicle load;

S4. according to the vehicle positioning data and vehicle load detection point detection data, identifying the vehicle loads matched with the start points and the end points of the bridge traveling path segments, and obtaining the vehicle loads passing through the bridge;

S41. selecting vehicle positioning data of a section where the bridge traveling direction is located, and constructing a lane-level GIS topological network of the section where the bridge traveling direction is located;

S42. determining the matching priority according to sampling frequency, constructing a vehicle positioning sequence set with different matching priorities for the vehicle positioning data of the section where the bridge traveling is located, and calculating possibility scores of vehicle positioning data points matching lanes;

S43. fitting by adopting a Gaussian distribution model, identifying a possibility of vehicle lane changing, calculating a probability of vehicle lane changing, and constructing a multi-mode vehicle lane changing probability model;

S44. constructing an optimal matching model between the vehicle positioning data based on the matching priority and the lanes of the section where the bridge is located according to constraint condition 1 and constraint condition 2;

S45. performing lane matching on vehicle positioning according to different priorities, solving vehicle positioning point matching results of different sampling frequencies by adopting the optimal matching model, and integrating to obtain a point set for vehicle trajectory correction;

S46. performing lane matching on the vehicle positioning data of the sections where bridge travelings of each bridge in the bridge group are located, and obtaining a matching result of the vehicle positioning data of the sections where bridge travelings are located;

S5. obtaining the spatial-temporal distribution of the vehicles on the bridge deck based on a bridge group lane-level road network simulation model;

S51. constructing the bridge group lane-level road network simulation model based on bridge design parameters and a microscopic traffic simulation model;

S52. obtaining a matching result of vehicle positioning data on the section where the bridge group is located and lanes of GIS road network topology by adopting the optimal matching model for positioning points based on the matching priority, calculating time and speed of a single vehicle entering the bridge, and correcting position conflicts of the vehicles;

S53. extracting a driving path of the vehicle on the bridge deck according to the matching result, and setting simulation model parameters in a bridge lane-level road network simulation model;

S54. running the lane-level road network simulation model to obtain the spatial-temporal distribution of vehicles, simulating each bridge in the bridge group, and integrating the spatial-temporal distribution of the vehicles on all the bridges in the bridge group to obtain the spatial-temporal distribution of the vehicles on the bridge deck; and

S6. matching the vehicle load of the vehicle passing through the bridge with the spatial-temporal distribution of the vehicles on the bridge deck by the vehicle positioning data to obtain the spatial-temporal distribution of the loads of each bridge in the bridge group, and integrating to obtain the spatial-temporal distribution of the loads of the bridge group.

Further, in the S12, the vehicle positioning data preprocessing includes missing value processing, error data processing and chronological ordering processing, and the GIS topological network section information includes section name, section ID, section road grade, number of lanes on the section number and direction of the lane on the section;

in the S13, the bridge group is selected according to the selected area, the bridge group is represented as b, $$b = \{b_1^e, b_2^e, \ldots, b_k^e\},$$

wherein e is bridge traveling, k is the number of bridges, the bridge group is matched with the GIS topological network section information to obtain sections matched with the bridge group, the section set that matches the bridge group with the GIS topological network is represented as r, $$r=\left\{r_{b_1^e}, r_{b_2^e}, \ldots, r_{b_k^e}\right\},$$

the vehicle positioning data is matched with the information of each section in the GIS topological network by adopting a hidden Markov model to obtain the section matched with the vehicle positioning data, the section set that matches the vehicle positioning data of vehicle j with the road network GIS topology, i.e., the vehicle trajectory of vehicle j is represented as $re^j$, $re^j=\{r_1, r_2, \ldots, r_m\}$, wherein m is the number of sections that the vehicle passes through, the set of sections that match the vehicle positioning data with the GIS topological network, i.e., the complete vehicle trajectory is represented as re, $re=\{re^1, re^j, \ldots, re^p\}$, wherein p is the number of vehicles; and in the S14, the section set r that matches the bridge group with the GIS topological network is matched with the section set re that matches the vehicle positioning data with the GIS topological network to obtain the vehicle trajectory passing through the sections where bridge travelings in the bridge group are located.

Further, in the S21, the vehicle load detection point information set is represented as ld, $ld=\{ld^1, ld^2, \ldots, ld^{r'}\}$, wherein r' is the number of load detection points, the complete vehicle trajectory re of each vehicle is divided into a plurality of path subsegments according to the ID of the section where the vehicle load detection point information set is located, the set of path subsegments after the vehicle trajectory $re^j$ of vehicle j is divided is represented as $$rs^j,\ rs^j=\left\{rs_1^j, rs_o^j, \ldots, rs_\alpha^j\right\},$$

wherein α is the number of path subsegments of the vehicle trajectory, $$rs_o^j$$

is the $o^{th}$ path subsegment after the vehicle trajectory of vehicle j is divided, and the path subsegment division result of all vehicle trajectories is obtained by integration and represented as rs, $rs=\{rs^1, rs^j, \ldots, rs^p\}$, and a start point vehicle load detection point $ld_{start}$ corresponding to the start of the path subsegment of each vehicle trajectory and an end point vehicle load detection point $ld_{end}$ corresponding to the end are obtained; and in the S22, for the regional bridge group, the path subsegments where bridges in the bridge group are located are matched, i.e., the number of path subsegments matched with the bridge travelings, according to the section set r that matches the bridge group with the GIS topological network and the path subsegment division result rs of all vehicle trajectories, the matching result i'=1, 2, . . . , k of the path subsegment set $rs^j$ of the vehicle trajectory $re^j$ of the j and the bridge $$b_{i'}^e,$$

i.e., the set of vehicle load segments matched with the travelings of the bridge $$b_{i'}^e$$

is represented as $$b\_rs_{b_{i'}^e}^j,\ b\_rs_{b_{i'}^e}^j=\left\{rs_1^j, rs_2^j, \ldots, rs_c^j\right\},$$

wherein c is the number of times the vehicle j passes through the bridge traveling e within the selected time, that is, the number of path subsegments matched with the bridge travelings.

Further, in the S31, the data corresponding to the start point vehicle load detection point $ld_{start}$ and the end point vehicle load detection point $ld_{end}$ are screened according to the license plate number, so as to obtain the vehicle load $$vl_{j'}^{start}$$

of the vehicle j passing through the start point vehicle load detection point, the detection time $$lt_{j'}^{start}$$

of the vehicle j passing through the start point vehicle load detection point, the vehicle load $$vl_{j'}^{end}$$

of the vehicle j passing through the end point vehicle load detection point, and the detection time $$lt_{j'}^{end}$$

of the vehicle j passing through the end point vehicle load detection point, wherein j' is the number of times the vehicle j passing through the vehicle load detection points;

in the step S32, the start point vehicle load detection point $ld_{start}$ or the end point vehicle load detection point $ld_{end}$ is selected and defined as a specific vehicle load detection point, the projection coordinates of the specific vehicle load detection point are represented as $(x_{ld}, y_{ld})$, the specific vehicle load detection point is u, the point coordinates of the data of a first vehicle positioning point matched with the GIS topological network before the specific vehicle load detection point are represented as $(x_u\ y_u)$, the time of the data of a first vehicle positioning point matched with the GIS topological network before the specific vehicle load detection point is represented as $tp_u$, the speed of the data of a first vehicle positioning point data matched with the GIS topological network before the specific vehicle load detection point is represented as $v_u$, the point coordinates of the data of a first vehicle positioning point matched with the GIS topological network after the specific vehicle load detection point are represented as $(x_{u+1}, y_{u+1})$, the time of the data of a first vehicle positioning point matched with the GIS topological network after the specific vehicle load detection point is represented as $tp_{u+1}$, the speed of the data of a first vehicle positioning point data matched with the GIS topological network after the specific vehicle load detection point is represented as $v_{u+1}$, and the predicted time of the vehicle passing through the specific vehicle load detection point is calculated;

the predicted time $t_{ld}$ of passing through the specific vehicle load detection point is represented as:

$$t_{ld} = tp_u + \frac{\sqrt{(x_{ld}-x_u)^2+(y_{ld}-y_u)^2}\,(t_{u+1}-t_u)}{\sqrt{(x_{ld}-x_u)^2+(y_{ld}-y_u)^2}+\sqrt{(x_{u+1}-x_{ld})^2+(x_{u+1}-y_{ld})^2}};$$

the predicted time $$t_{ld}^{start}$$

of the vehicle passing through the start point vehicle load detection point and the predicted time $$t_{ld}^{end}$$

of the vehicle passing through the end point vehicle load detection point are obtained based on the predicted time $t_{ld}$ of the vehicle passing through the specific vehicle load detection point;

in the S33, an allowable error range between the predicted time $t_{ld}$ of passing through the specific vehicle load detection point and the actual time detected at the specific vehicle load detection point is set as $\delta_0$;

when the error $\delta$ between the predicted time of passing through the vehicle load detection point and the actual time detected at the specific vehicle load detection point is less than the allowable error range $\delta_0$, the expression is as follows:

$$ff = \underset{j'=1}{\overset{h}{\arg\min}} \frac{|t_{ld}^{start} - t_{j'}^{start}| + |t_{ld}^{end} - t_{j'}^{end}|}{2};$$

$$\frac{|t_{ld}^{start} - lt_{j'}^{start}| + |t_{ld}^{end} - lt_{j'}^{end}|}{2} \le \delta_0;$$

ff is the minimum average error between the predicted time of the start point vehicle load detection point and the predicted time of the end point vehicle load detection point, and h is the number of times the vehicle passes through the load segment;

the vehicle loads and time of the vehicle load detection points corresponding to load segments within all allowable error ranges are obtained and recorded as the vehicle load $$vl_u^{start*}$$

of the actual start point vehicle load detection point, the vehicle load $$vl_u^{end*}$$

of the actual end point vehicle load detection point, the detection time $$lt_u^{start*}$$

of the actual start point vehicle load detection point, and the detection time $$lt_k^{end*}$$

of the actual end point vehicle load detection point;

an actual vehicle load passing through the bridge is obtained according to the vehicle load $$vl_u^{start*}$$

of the actual start point vehicle load detection point and the vehicle load $$vl_u^{end*}$$

of the actual end point vehicle load detection point;

the actual vehicle load $vl_{b_i}$ is represented as:

$$vl_{b_i} = \frac{vl_u^{start*} + vl_u^{end*}}{2}.$$

Further, in the S41, the vehicle positioning data of vehicles passing through the sections where bridge travelings in the bridge group are located is obtained, and a GIS road network topology is constructed with a section entrance where the bridge travel is located as a start point and a section exit where the bridge travel is located as an end point according to the number of lanes, the length of lanes, and GIS data of the sections where the bridge traveling directions are located;

in the S42, for the vehicle positioning data of the section where the single bridge traveling in the bridge group is located, the vehicle positioning data is sorted from high to low according to the sampling frequency, and a vehicle positioning sequence set S with different matching priorities is constructed, $S=\{S_1, S_2, \ldots, S_{r''}\}$, wherein r" is the number of vehicles passing through the single bridge traveling direction of the bridge;

the possibility of the vehicle positioning points on each lane is evaluated by adopting a Gaussian distribution function, and the set of the lanes of the section where the bridge is located is bl, $bl=\{bl_1, bl_2, \ldots, bl_{s'}\}$, wherein s' is the number of the lanes of the section where the bridge is located, the shortest distance from the vehicle positioning points to the GIS road network topology of the lanes and the possibility score of the vehicle positioning points in the lanes are calculated in the driving process of the same lane;

the possibility score $$p^i_{k'}$$

of the vehicle location point k' in the lane i is represented as:

$$p^i_{k'} = \frac{1}{\sqrt{2\pi\delta^2}} e^{-\frac{d^i_{k'}}{2\delta^2}};$$

$\delta^2$ is the Gaussian model parameter, which is obtained by using the moment estimation parameter estimation method based on historical data, i=1, 2, . . . , s';

the shortest distance $$d^i_{k'}$$

between the vehicle positioning point k' and the GIS road network topology corresponding to the lane i is represented as:

$$d^i_{k'} = \sqrt{(x_{k'} - x^i_{k'})^2 + (y_{k'} - y^i_{k'})^2};$$

$$(x^i_{k'}, y^i_{k'})$$

is the projection coordinates of the points on the GIS road network topology corresponding to the lane i that is the shortest distance from the vehicle positioning point k', and $(x_{k'}, y_{k'})$ is the projection coordinates of the vehicle positioning point k';

in the step S43, according to the characteristic that the possibility of vehicle lane changing is smaller when the angle difference between the vehicle trajectory formed by the vehicle positioning points and the lane line shape is larger, a Gaussian distribution model is used for fitting to identify the possibility of vehicle lane changing;

the probability $$pc^i_{k'}$$

of not changing lanes when the vehicle positioning point k' is on the lane i is represented as:

$$pc^i_{k'} = 1 - \frac{1}{\sqrt{2\pi\lambda^2}} e^{-\frac{\theta^i_{k'}}{2\lambda^2}};$$

the angle between the vector formed by the current vehicle positioning point k' and the previous vehicle positioning point i and the line shape of the lane $$\theta^i_{k'}$$

is represented:

$$\theta^i_{k'} = \arccos\left(\frac{(x_{k'} - x_{k'-1}, y_{k'} - y_{k'-1}) \cdot (x^*_{k'} - x^*_{k'-1}, y^*_{k'} - y^*_{k'})}{\sqrt{(x_{k'} - x_{k'-1})^2 + (y_{k'} - y_{k'-1})^2}\sqrt{(x^*_{k'} - x^*_{k'-1})^2 + (y^*_{k'} - y^*_{k'})^2}}\right);$$

$(x_{k-1}, y_{k-1})$ is the projection coordinates of the previous point of the vehicle positioning point k', $(x_k^*, y_k^*)$ is the point with the shortest distance from the vehicle positioning point k' on the current lane GIS road network topology to the projection coordinates $(x_k, y_k)$ of the vehicle positioning point k', $(x_{k-1}^*, y_{k-1}^*)$ is the point with the shortest distance from the vehicle positioning point k' on the current lane GIS road network topology to the previous projection coordinates $(x_{k-1}, y_{k-1})$ of the vehicle positioning point k', and $\lambda^2$ is the model parameter, which is estimated and obtained by using the moment estimation method based on historical data;

the probability of vehicle lane changing is calculated according to the fact that the greater the distance between different lanes, the smaller the possibility of vehicle lane changing;

the probability $$pc^{i,v}_{k'}$$

of the vehicle changing from lane i to lane v is represented as:

$$pc^i_{k'} = \frac{d^{i,v}}{\sum_{v=1}^{s'} d^{i,v}} * \frac{1}{\sqrt{2\pi\lambda^2}} e^{-\frac{\theta^i_{k'}}{2\lambda^2}}, v \neq i;$$

$d^{i,v}$ is the distance between the lane i and the lane v;

a multi-modal lane changing probability model $$g^{i,v}_{k'}$$

of vehicle positioning points in the vehicle positioning data is obtained by integration;

$$g^{i,v}_{k'} = \begin{cases} 1 - \frac{1}{\sqrt{2\pi\lambda^2}} e^{-\frac{\theta}{2\lambda^2}}, & v = i \\ \frac{d^{i,v}}{\sum_{v=1}^{s'} d^{i,v}} * \frac{1}{\sqrt{2\pi\lambda^2}} e^{-\frac{\theta}{2\lambda^2}}, & v \neq i \end{cases};$$

when v=i, the vehicle does not change the lane, and when v≠i, the vehicle changes the lane;

in the step S44, each vehicle positioning data point is matched with the lane, the goal is to maximize the sum of the possibility scores of lane positioning points in the lanes and the probability of the vehicle lane changing during the driving process of the vehicle, and a global optimal matching model of the vehicle positioning data and the lanes of the section where the bridge is located is established;

the optimal matching model f of the vehicle positioning data and the lanes of the section where the bridge is located is represented as:

$$f = \max\left(\sum_{j=1}^{N} p_q^i g_q^{i,v}\right);$$

$$p_q^i$$

is the probability that the vehicle is in lane $$i,\ g_q^{i,v}$$

is the probability that the vehicle changes from lane i to lane v, N is the number of positioning points of the vehicle on the section where the bridge is located, and q is the vehicle positioning point;

the constraint condition 1 is lane change constraint, the vehicle lane changing is constrained in the matching process, whether the lane change directions of each lane of the bridge meets the number of lanes of the bridge is judged, the lane $h(bl_i, a')$ where the vehicle is located after the lane $bl_i$ changes in the lane changing direction a' is obtained, and if there is no corresponding lane on the bridge after changing lanes in the lane changing direction a', it is represented as 0;

the lane change constraint can be represented as:

$$h(bl_i, a') \neq 0;$$

the constraint condition 2 is vehicle position constraint, the vehicle position conflicts at the same moment are constrained, the positioning data of vehicles on the section where the bridge is located is matched according to the sampling frequency of vehicle positioning data as the priority, at the same moment, the matching position of the vehicle positioning point which is not matched does not conflict with the position of the vehicle which is matched previously, that is, the error between the matching position of the vehicle positioning point combined with the lane length occupied by the vehicle length and the point position of the previously matched vehicle combined with the lane length occupied by the vehicle length at the same moment should be less than a set error value, the coordinates of the to-be-matched vehicle positioning point k' are $(bx_{k'}, by_{k'})$, the point with the shortest distance from the vehicle positioning point k' to the GIS road network topology matched with lane i is $$\left(gbx_{u'}^i, gby_{u'}^i\right),$$

the vehicle length corresponding to the vehicle positioning point k' is $vl_{k'}$, the coordinates of the matched vehicle positioning point q at the same moment as the vehicle positioning point k' are $(hx_q, hy_q)$, the point with the shortest distance from the vehicle positioning point q to the GIS road network topology matched with lane i is $$\left(gbx_{v'}^i, gby_{v'}^i\right),$$

and the vehicle length is $vl_q$, and the allowable position conflict error is $\chi$;

the vehicle position constraint is represented as:

$$\sqrt{\left(gbx_{u'}^i - ghx_{v'}^i\right)^2 + \left(gby_{u'}^i - ghy_{v'}^i\right)^2} - \frac{v_{k'}^i + vl_q}{2} \leq \chi;$$

in the step S45, according to the constructed vehicle positioning sequence set $S_{r'}$ with different matching priorities, the optimal matching model is solved in the order of the sequence to obtain the matching results of vehicle positioning points with different sampling frequencies, including the matched lane number and the coordinate point closest to the vehicle positioning point on the matched lane GIS road network topology, and the coordinate point closest to the vehicle positioning point on the matched lane GIS road network topology is integrated into the point set S" for vehicle trajectory correction $S''=\{S_1'', S_2'', \ldots, S_{r''}''\}$.

Further, in the S51, for the bridge group, a lane-level traffic simulation road network is established by bridge travelings; and for a single bridge, according to the bridge design parameters, the bridge length, the entrance, the exit, lane width and lane length are obtained, and a lane-level traffic simulation road network model for the bridge deck is established with the bridge entrance as the start point and the bridge exit as the end point;

in the step S52, the matching results of the adjacent vehicle positioning data before and after vehicles enter the bridge are intercepted and sorted according to the sampling frequency to determine the priority, according to the positions of lanes at the bridge entrance, the data of two adjacent positioning points before and after vehicles enter the bridge entrance and the position of the matching result on the lane are obtained from the matching results of the positioning points and the lanes, the matching result set si of adjacent vehicle positioning point before and after vehicles enter the bridge is obtained by sorting according to the sampling frequency, $si=\{sv_1, sv_2, \ldots, sv_{q'}\}$, and q' is the number of vehicles in a selected time;

the matching result of vehicle positioning data on the section where the bridge group is located and lanes of GIS road network topology is obtained by adopting the optimal matching model for positioning points based on the matching priority, the matching result sets of adjacent vehicle positioning points before and after vehicles enter the bridge are processed in sequence, and the corresponding vehicle model and vehicle length are obtained according to the vehicle positioning data;

for the bridge traveling line shape, according to the set spatial-temporal sampling frequency, the GIS road network topology data of lane line shapes of the section where the bridge is located is divided into a plurality of discrete points, and the GIS road network topology data point set $Gbx^i$ of lane line shapes of the section where the bridge is located is constructed, $$Gbx^i = \{gbx_1^i, gbx_2^i, \ldots, gbx_l^i\},$$

and l is the number of GIS road network topology data points of lane i;

according to the matching result set si of adjacent vehicle positioning points before and after vehicles enter the bridge, the generation information of the vehicle at the bridge entrance, i.e., the time, the speed and the lane of the single vehicle entering the bridge is calculated, the coordinates of the adjacent vehicle positioning points of a single vehicle before the bridge entrance are ($bx_{k'}'$, $by_{k'}'$), the coordinates of the adjacent vehicle positioning points of a single vehicle after the bridge entrance are ($bx_{k'+1}'$, $by_{k'+1}'$), the coordinates of the point on the matched lane GIS road network topology corresponding to the adjacent vehicle positioning points of a single vehicle before the bridge entrance are $$(gbx_{u'}^{i'}, gby_{u'}^{i'}),$$

the coordinates of the point on the matched lane GIS road network topology corresponding to the adjacent vehicle positioning points of a single vehicle after the bridge entrance are $$(gbx_{u'+c}^{v'}, gby_{u'+c}^{v'}),$$

the detection time of adjacent vehicle positioning points for a single vehicle before the bridge entrance is $t_{u'}$, the detection time of adjacent vehicle positioning points for a single vehicle after the bridge entrance is $t_{u'+c}$, c=1, 2, . . . n, the vehicle speed of the adjacent vehicle positioning points of a single vehicle before the bridge entrance is $$V_{u'}^{i},$$

the vehicle speed of the adjacent vehicle positioning points of a single vehicle after the bridge entrance is $$V_{u'+c}^{v},$$

the matching result point on the GIS road network topology of the lane at the bridge entrance is $$(gbx_{u'+b}^{i'}, gby_{u'+b}^{i'}) \text{ or } (gbx_{u'+b}^{v'}, gby_{u'+b}^{v'}),\ b < c;$$

when the vehicle positioning point matching results $$(gbx_{u'}^{i'}, gby_{u'}^{i'}) \text{ and } (gbx_{u'+c}^{v'}, gby_{u'+c}^{v'})$$

are at the same lane, that is, i=v, the time when the vehicle enters the bridge is calculated;

the time $t_{u'+b}$ of the vehicle entering the bridge is represented as:

$$t_{u'+b} = t_{u'} + (t_{u'+c} - t_{u'}) * \frac{\sum_{k'=0}^{b-1} \sqrt{\left(gbx_{u'+k+1}^{i} - ghx_{u'+k'}^{i}\right)^2 + \left(gby_{u'+k'+1}^{i} - ghy_{u'+k'}^{i}\right)^2}}{\sum_{k'=0}^{c-1} \sqrt{\left(gbx_{u'+k+1}^{i} - ghx_{u'+k'}^{i}\right)^2 + \left(gby_{u'+k'+1}^{i} - ghy_{u'+k'}^{i}\right)^2}};$$

when the vehicle positioning point matching results $$(gbx_{u'}^{i'}, gby_{u'}^{i'}) \text{ and } (gbx_{u'+c}^{v'}, gby_{u'+c}^{v'})$$

(are in different lanes, that is, i≠v, the lane matched with the vehicle positioning point with the shortest distance to the bridge entrance is used as the lane for the vehicle to enter the bridge, and when the vehicle positioning point with the shortest distance to the bridge entrance is $$(gbx_{u'}^{i'}, gby_{u'}^{i'}),$$

the time of the vehicle entering the bridge is $t_{u'+b}$;

when the vehicle positioning point with the shortest distance to the bridge entrance is $$(gbx_{u'+c}^{v'}, gby_{u'+c}^{v'}),$$

the time of the vehicle entering the bridge is $t_{u'+b}'$;

the time $t_{u'+b}'$ of the vehicle entering the bridge is represented as:

$$t_{u'+b}' = t_{u'} + (t_{u'+c} - t_{u'}) * \left(1 - \frac{\sum_{k'=0}^{c-b+1} \sqrt{(gbx_{u'+k'+1}^{v} - ghx_{u'+k'}^{v})^2 + (gby_{u'+k'+1}^{v} - ghy_{u'+k'}^{v})^2}}{\sum_{k'=0}^{c-1} \sqrt{(gbx_{u'+k'+1}^{v} - ghx_{u'+k'}^{v})^2 + (gby_{u'+k'+1}^{v} - ghy_{u'+k'}^{v})^2}}\right);$$

according to the vehicle speed $$V_u^v$$

when the vehicle positioning point is $$(gbx_{u'}^{i'}, gby_{u'}^{i'})$$

and the vehicle speed $$V^{v}_{u+c}$$

when the vehicle positioning point is $$\left(gbx^{v'}_{u'+c}, gby^{v'}_{u'+c}\right),$$

the average speed V' of the vehicle when entering the bridge is obtained;

the average speed V' of the vehicle when entering the bridge is represented as:

$$V' = \frac{V^{v}_{u} + V^{v}_{u+c}}{2};$$

the time and lane of the vehicle entering the bridge are corrected, when the time and lane of two vehicles entering the bridge conflict, that is, vehicle positioning point $$\left(gbx^{i'}_{u'}, gby^{i'}_{u'}\right)$$

and vehicle positioning point $$\left(gbx^{v'}_{u'+c}, gby^{v'}_{u'+c}\right)$$

are at the same lane, i=v, the vehicle speed is corrected by correcting parameter d and then the time of the vehicle entering the bridge is corrected until the lanes do not conflict, and the corrected speed and the corrected time when the vehicle enters the bridge are obtained;

the corrected speed V" is represented as:

$$V'' = \frac{V^{i'}_{u'} + dV^{i'}_{u'+c}}{1+d}, d = 1, 2, \ldots \infty;$$

the corrected time when the vehicle enters the bridge is represented as:

$$t''_{u'+b} = t_{u'} + \frac{\sum_{k'=0}^{b-1} \sqrt{\left(gbx^{i}_{u'+k'+1} - ghx^{i}_{u'+k'}\right)^2 + \left(gby^{i}_{u'+k'+1} - ghy^{i}_{u'+k'}\right)^2}}{V''};$$

when the vehicle positioning point $$\left(gbx^{i'}_{u'}, gby^{i'}_{u'}\right)$$

and the vehicle positioning point $$\left(gbx^{v'}_{u'+c}, gby^{v'}_{u'+c}\right)$$

are at different lanes, i≠v, the vehicle position conflict is solved by modifying the lane where the current vehicle is located, and when there is a time or lane conflict after lane modification, the vehicle position conflict is resolved by correcting the time to enter the bridge;

in the step S53, based on the optimal matching model of the vehicle positioning data with matching priority and the lanes of the section where the bridge is located, the matching result of the vehicle positioning data and lanes in the section where the bridge in the single-travel direction is located, and according to the position of the bridge on the section, the driving trajectories of the vehicle on the lanes on a bridge deck are obtained as the driving path input of the vehicle in the lane-level road network simulation model, and the model parameters include a simulation step, a vehicle following model and a vehicle lane changing model; and in the step S54, the generated information of the vehicles at the bridge entrance and the vehicle trajectories of the vehicles in the lanes are input into a bridge lane-level road network simulation model, the simulation is run, and the lanes and the longitudinal positions of the vehicles on the bridge at different moments, i.e., the spatial-temporal distribution of the vehicles on the bridge deck, are output, and the spatial-temporal distribution of the vehicles on the bridge deck is obtained by integration.

Further, the simulation step is obtained according to the time interval of the spatial-temporal distribution of the vehicles on the bridge deck, the vehicle following model is a Wiedemann following model, and the lane changing model is a rule-based model.

The present application has the following beneficial effects. After considering the vehicle correlation and time correlation between vehicle positioning data and vehicle load detection data and combining the characteristics of the vehicle load being unchanged within a certain period of time, the present application provides a bridge vehicle load identification method integrating vehicle positioning data and load detection points, which takes the vehicle positioning points as nodes, divides a vehicle trajectory into a plurality of load segments and obtains the load segment where a bridge is located, and simultaneously performs correlation matching on the vehicle positioning data and vehicle load detection point data in the load segment where the bridge is located according to license plate and time characteristics to obtain actual load data when a vehicle passes through the bridge. The present application considers the advantages of vehicle positioning data being available all day and with continuous trajectories, and integrates vehicle load data based on features such as license plates and spatial-temporal correlation to achieve spatial-temporal distribution identification of loads of large-scale bridge group in the city. The present application makes full use of existing systems such as dynamic weighing systems and overload control point systems, and does not require the mounting of dynamic weighing systems, video equipment and structural health monitoring systems, which greatly reduces monitoring costs, reduces time consumption, and does not require manual operation. Considering that the higher the sampling frequency, the more accurate the extracted features are, the section lane target optimization matching method based on matching priority is adopted, and the sampling frequency is used as the priority for matching different vehicle positioning data; for the positioning data of a single vehicle, the goal is to maximize the sum of the product of the probability of the lane where the vehicle positioning point is located and the probability of the vehicle lane changing during the process of the vehicle from the section entrance to the section exit; according to the vehicle lane change constraint and the vehicle position constraint, the optimal matching result between the vehicle positioning point and the road section lane is obtained, which provides accurate vehicle trajectories and the lane where the bridge entrance is located for the bridge deck vehicle spatial-temporal distribution identification method based on the microscopic traffic simulation model, thereby reducing the later identification error. The present application can fully integrate vehicle load detection data from different sources such as the overload control point system, dynamic weighing system and source overload control system, as well as vehicle positioning data of different vehicle types, including truck positioning data, taxi positioning data, online car-hailing positioning data, bus positioning data, and passenger and dangerous goods transport vehicle positioning data, and enhances the data value through the reuse and integration of multi-source vehicle positioning data and multi-source vehicle load data to achieve the spatial-temporal distribution identification of vehicles on the bridge deck. The present application matches the vehicle load of vehicles passing through the bridge with the spatial-temporal distribution of vehicles on the bridge deck through vehicle positioning data, obtains the spatial-temporal distribution of the loads of each bridge in the bridge group, integrates to obtain the spatial-temporal distribution of the loads of the bridge group, and achieves the identification of real-time vehicle loads on the bridge group.

BRIEF DESCRIPTION OF DRAWINGS

The drawings described herein are used to provide a further understanding of the present application and constitute a part of this specification. The illustrative embodiments of the present application and the descriptions thereof are used to explain the present application and do not constitute improper limitations on the present application. In the drawings:

FIG. 1 is a schematic flow chart of a method for identifying a spatial-temporal load distribution of a bridge group based on multi-source data fusion.

DETAILED DESCRIPTION

To make the technical solutions and advantages in the embodiments of the present application more clearly understood, the following detailed description of the exemplary embodiments of the present application is made in conjunction with the drawings. It is obvious that the described embodiments are only a part of the embodiments of the present application, and are not exhaustive of all the embodiments. It should be noted that embodiments in the present application and the features in embodiments may be mutually combined in the case of no conflict.

Referring to FIG. 1, this embodiment is described in detail. A method for identifying the spatial-temporal load distribution of a bridge group based on multi-source data fusion specifically includes the following steps:

S1. performing GIS topological network matching on a vehicle based on vehicle positioning data to obtain vehicle trajectory data;

S11. selecting vehicle load detection points in an area, and extracting and collecting vehicle load detection data and vehicle positioning data; wherein specifically, the vehicle load detection points include an overload control point, a source overload control detection point, a high-speed weight toll detection point and a bridge dynamic weighing detection point, vehicle load detection data and vehicle positioning data in the same selected time are selected in a selected area, the vehicle load detection data, i.e., the collected vehicle load detection point information, includes a license plate number, detection time, a vehicle load and an ID, a longitude and a latitude of a section where the vehicle load is located, and the vehicle positioning data include a vehicle length, a vehicle model, a vehicle type, a license plate number, time, a driving speed and longitude and latitude coordinates;

S12. preprocessing the vehicle positioning data, and collecting GIS topological network section information of a road network;

S13. collecting bridge group information, and matching the vehicle positioning data with the GIS topological network section information;

S14. according to the GIS topological network section information, obtaining vehicle positioning data matched with bridge traveling sections in the bridge group to form vehicle trajectory data;

S2. segmenting the vehicle trajectory based on the vehicle load detection points, and obtaining a path segment where the bridge is located in combination with the section where the bridge is located;

S21. dividing all vehicle trajectories into a plurality of path subsegments according to the ID of the section where the vehicle load detection points are located;

S22. extracting path subsegments where bridge travelings of each bridge in the bridge group are located according to a section where the bridge traveling in bridge group information is located;

S3. according to the vehicle positioning data and vehicle load data, identifying vehicle loads matched with start points and end points of traveling path segments of each bridge in the bridge group, and calculating an actual vehicle load passing through the bridge;

S31. respectively identifying a start point vehicle load detection point and an end point vehicle load detection point corresponding to a vehicle entering segment and a vehicle exiting segment of each path subsegment of vehicle load segment sets matched with bridge travelings, and calculating detection time and vehicle load passing through the two points;

S32. selecting a specific vehicle load detection point, and calculating predicted time of the specific vehicle load detection point, predicted time of the vehicle passing through the start point vehicle load detection point and predicted time of the vehicle passing through the end point vehicle load detection point based on the vehicle positioning data;

S33. matching the vehicle positioning data with vehicle load data of a segment from the start point vehicle load detection point to the end point vehicle load detection point, i.e., a load segment, and obtaining the actual vehicle load;

S4. according to the vehicle positioning data and vehicle load detection point detection data, identifying the vehicle loads matched with the start points and the end points of the bridge traveling path segments, and obtaining the vehicle loads passing through the bridge;

S41. selecting vehicle positioning data of a section where the bridge traveling direction is located, and constructing a lane-level GIS topological network of the section where the bridge traveling direction is located;

S42. determining the matching priority according to sampling frequency, constructing a vehicle positioning sequence set with different matching priorities for the vehicle positioning data of the section where the bridge traveling is located, and calculating possibility scores of vehicle positioning data points matching lanes;

S43. fitting by adopting a Gaussian distribution model, identifying a possibility of vehicle lane changing, calculating a probability of vehicle lane changing, and constructing a multi-mode vehicle lane changing probability model;

S44. constructing an optimal matching model between the vehicle positioning data based on the matching priority and the lanes of the section where the bridge is located according to constraint condition 1 and constraint condition 2;

S45. performing lane matching on vehicle positioning according to different priorities, solving vehicle positioning point matching results of different sampling frequencies by adopting the optimal matching model, and integrating to obtain a point set for vehicle trajectory correction;

S46. performing lane matching on the vehicle positioning data of the sections where bridge travelings of each bridge in the bridge group are located, and obtaining a matching result of the vehicle positioning data of the sections where bridge travelings are located;

S5. obtaining the spatial-temporal distribution of the vehicles on the bridge deck based on a bridge group lane-level road network simulation model;

S51. constructing the bridge group lane-level road network simulation model based on bridge design parameters and a microscopic traffic simulation model;

S52. obtaining a matching result of vehicle positioning data on the section where the bridge group is located and lanes of GIS road network topology by adopting the optimal matching model for positioning points based on the matching priority, calculating time and speed of a single vehicle entering the bridge, and correcting position conflicts of the vehicles;

S53. extracting a driving path of the vehicle on the bridge deck according to the matching result, and setting simulation model parameters in a bridge lane-level road network simulation model;

S54. running the lane-level road network simulation model to obtain the spatial-temporal distribution of vehicles, simulating each bridge in the bridge group, and integrating the spatial-temporal distribution of the vehicles on all the bridges in the bridge group to obtain the spatial-temporal distribution of the vehicles on the bridge deck; and S6. matching the vehicle load of the vehicle passing through the bridge with the spatial-temporal distribution of the vehicles on the bridge deck by the vehicle positioning data to obtain the spatial-temporal distribution of the loads of each bridge in the bridge group, and integrating to obtain the spatial-temporal distribution of the loads of the bridge group.

Further, in the S12, the vehicle positioning data preprocessing includes missing value processing, error data processing and chronological ordering processing, and the GIS topological network section information includes section name, section ID, section road grade, number of lanes on the section number and direction of the lane on the section;

in the S13, the bridge group is selected according to the selected area, the bridge group is represented as $$b,\ b = \{b_1^e, b_2^e, \ldots, b_k^2\},$$

wherein e is bridge traveling, k is the number of bridges, the bridge group is matched with the GIS topological network section information to obtain sections matched with the bridge group, the section set that matches the bridge group with the GIS topological network is represented as $$r,\ r = \{r_{b_1^e}, r_{b_2^e}, \ldots, r_{b_k^e}\},$$

the vehicle positioning data is matched with the information of each section in the GIS topological network by adopting a hidden Markov model to obtain the section matched with the vehicle positioning data, the section set that matches the vehicle positioning data of vehicle j with the road network GIS topology, i.e., the vehicle trajectory of vehicle j is represented as $re^j$, $re^j=\{r_1, r_2, \ldots, r_m\}$, wherein m is the number of sections that the vehicle passes through, the set of sections that match the vehicle positioning data with the GIS topological network, i.e., the complete vehicle trajectory is represented as re, $re=\{re^1, re^j, \ldots, re^p\}$, wherein p is the number of vehicles; and in the S14, the section set r that matches the bridge group with the GIS topological network is matched with the section set re that matches the vehicle positioning data with the GIS topological network to obtain the vehicle trajectory passing through the sections where bridge travelings in the bridge group are located;

specifically, when the bridge has only one traveling, e is 1; when the bridge has two travelings, e is 1 or 2, the vehicle positioning data is obtained by collecting positioning data of vehicles such as trucks, buses, and passenger and dangerous goods transport vehicle, as well as vehicle navigation data.

Further, in the S21, the vehicle load detection point information set is represented as ld, $ld=\{ld^1, ld^2, \ldots, ld^{r'}\}$, wherein r' is the number of load detection points, the complete vehicle trajectory re of each vehicle is divided into a plurality of path subsegments according to the ID of the section where the vehicle load detection point information set is located, the set of path subsegments after the vehicle trajectory $re^j$ of vehicle j is divided is represented as $$rs^j,\ rs^j = \{rs_1^j, rs_o^j, \ldots, rs_a^j\},$$

wherein α is the number of path subsegments of the vehicle trajectory, $$rs_o^j$$

is the $o^{th}$ path subsegment after the vehicle trajectory of vehicle j is divided, and the path subsegment division result of all vehicle trajectories is obtained by integration and represented as rs, $rs=\{rs^1, rs^j, \ldots, rs^p\}$, and a start point vehicle load detection point $ld_{start}$ corresponding to the start of the path subsegment of each vehicle trajectory and an end point vehicle load detection point $ld_{end}$ corresponding to the end are obtained; and in the S22, for the regional bridge group, the path subsegments where bridges in the bridge group are located are matched, i.e., the number of path subsegments matched with the bridge travelings, according to the section set r that matches the bridge group with the GIS topological network and the path subsegment division result rs of all vehicle trajectories, the matching result i'=1, 2, . . . , k of the path subsegment set $rs^j$ of the vehicle trajectory $re^j$ of the j and the bridge $$b_{i'}^{e},$$

i.e., the set of vehicle load segments matched with the travelings of the bridge $$b_{i'}^{e},$$

is represented as $$\text{b\_rs}_{b_{i'}^{e}}^{j},\ \text{b\_rs}_{b_{i'}^{e}}^{j} = \{rs_1^j, rs_2^j, \ldots , rs_c^j\},$$

wherein c is, the number of times the vehicle j passes through the bridge traveling e within the selected time, that is, the number of path subsegments matched with the bridge travelings.

Further, in the S31, the data corresponding to the start point vehicle load detection point $ld_{start}$ and the end point vehicle load detection point $ld_{end}$ are screened according to the license plate number, so as to obtain the vehicle load $$vl_{j'}^{start}$$

of the vehicle j passing through the start point vehicle load detection point, the detection time $$lt_{j'}^{start}$$

of the vehicle j passing through the start point vehicle load detection point, the vehicle load $$vl_{j'}^{end}$$

of the vehicle j passing through the end point vehicle load detection point, and the detection time $$lt_{j'}^{end}$$

of the vehicle j passing through the end point vehicle load detection point, wherein j' is the number of times the vehicle j passing through the vehicle load detection points;

in the step S32, the start point vehicle load detection point $ld_{start}$ or the end point vehicle load detection point $ld_{end}$ is selected and defined as a specific vehicle load detection point, the projection coordinates of the specific vehicle load detection point are represented as $(x_{ld}, y_{ld})$, the specific vehicle load detection point is u, the point coordinates of the data of a first vehicle positioning point matched with the GIS topological network before the specific vehicle load detection point are represented as $(x_u, y_u)$, the time of the data of a first vehicle positioning point matched with the GIS topological network before the specific vehicle load detection point is represented as $tp_u$, the speed of the data of a first vehicle positioning point data matched with the GIS topological network before the specific vehicle load detection point is represented as $v_u$, the point coordinates of the data of a first vehicle positioning point matched with the GIS topological network after the specific vehicle load detection point are represented as $(x_{u+1}, y_{u+1})$, the time of the data of a first vehicle positioning point matched with the GIS topological network after the specific vehicle load detection point is represented as $tp_{u+1}$, the speed of the data of a first vehicle positioning point data matched with the GIS topological network after the specific vehicle load detection point is represented as $v_{u+1}$, and the predicted time of the vehicle passing through the specific vehicle load detection point is calculated;

the predicted time $t_{ld}$ of passing through the specific vehicle load detection point is represented as:

$$t_{ld} = tp_u + \frac{\sqrt{(x_{ld} - x_u)^2 + (y_{ld} - y_u)^2}\,(t_{u+1} - t_u)}{\sqrt{(x_{ld} - x_u)^2 + (y_{ld} - y_u)^2} + \sqrt{(x_{u+1} - x_{ld})^2 + (x_{u+1} - y_{ld})^2}};$$

the predicted time $$t_{ld}^{start}$$

of the vehicle passing through the start point vehicle load detection point and the predicted time $$t_{ld}^{end}$$

of the vehicle passing through the end point vehicle load detection point are obtained based on the predicted time $t_{ld}$ of the vehicle passing through the specific vehicle load detection point;

in the S33, an allowable error range between the predicted time $t_{ld}$ of passing through the specific vehicle load detection point and the actual time detected at the specific vehicle load detection point is set as $\delta_0$;

when the error $\delta$ between the predicted time of passing through the vehicle load detection point and the actual time detected at the specific vehicle load detection point is less than the allowable error range $\delta_0$, the expression is as follows:

$$ff = \underset{j'=1}{\overset{h}{\arg\min}} \frac{\left|t_{ld}^{start} - t_{j'}^{start}\right| + \left|t_{ld}^{end} - t_{j'}^{end}\right|}{2};$$

$$\frac{\left|t_{ld}^{start} - lt_{j'}^{start}\right| + \left|t_{ld}^{end} - lt_{j'}^{end}\right|}{2} \le \delta_0;$$

ff is the minimum average error between the predicted time of the start point vehicle load detection point and the predicted time of the end point vehicle load detection point, and h is the number of times the vehicle passes through the load segment;

the vehicle loads and time of the vehicle load detection points corresponding to load segments within all allowable error ranges are obtained and recorded as the vehicle load $$vl_u^{start*}$$

of the actual start point vehicle load detection point, the vehicle load $$vl_u^{end*}$$

of the actual end point vehicle load detection point, the detection time $$lt_u^{start*}$$

of the actual start point vehicle load detection point, and the detection time $$lt_k^{end*}$$

of the actual end point vehicle load detection point;

an actual vehicle load passing through the bridge is obtained according to the vehicle load $$vl_u^{start*}$$

of the actual start point vehicle load detection point and the vehicle load $$vl_u^{end*}$$

of the actual end point vehicle load detection point;

the actual vehicle load $vl_{b_i}$ is represented as:

$$vl_{b_i} = \frac{vl_u^{start*} + vl_u^{end*}}{2};$$

specifically, since a single vehicle may pass through the same vehicle load detection point multiple times and the loads may be different at different times, the unique vehicle load when the vehicle passes through the vehicle load detection point is matched with the vehicle ID and detection time, that is, the actual vehicle load.

Further, in the S41, the vehicle positioning data of vehicles passing through the sections where bridge travelings in the bridge group are located is obtained, and a GIS road network topology is constructed with a section entrance where the bridge travel is located as a start point and a section exit where the bridge travel is located as an end point according to the number of lanes, the length of lanes, and GIS data of the sections where the bridge traveling directions are located;

in the S42, for the vehicle positioning data of the section where the single bridge traveling in the bridge group is located, the vehicle positioning data is sorted from high to low according to the sampling frequency, and a vehicle positioning sequence set S with different matching priorities is constructed, $S=\{S_1, S_2, \ldots, S_{r''}\}$, wherein r'' is the number of vehicles passing through the single bridge traveling direction of the bridge;

the possibility of the vehicle positioning points on each lane is evaluated by adopting a Gaussian distribution function, and the set of the lanes of the section where the bridge is located is bl, $bl=\{bl_1, bl_2, \ldots, bl_{s'}\}$, wherein s' is the number of the lanes of the section where the bridge is located, the shortest distance from the vehicle positioning points to the GIS road network topology of the lanes and the possibility score of the vehicle positioning points in the lanes are calculated in the driving process of the same lane;

the possibility score $$p_{k'}^i$$

of the vehicle location point k' in the lane i is represented as:

$$p_{k'}^i = \frac{1}{\sqrt{2\pi\delta^2}} e^{-\frac{d_{k'}^i}{2\delta^2}};$$

$\delta^2$ is the Gaussian model parameter, which is obtained by using the moment estimation parameter estimation method based on historical data, $i=1, 2, \ldots, s'$;

the shortest distance $$d_{k'}^i$$

between the vehicle positioning point k' and the GIS road network topology corresponding to the lane i is represented as:

$$d_{k'}^i = \sqrt{\left(x_{k'} - x_{k'}^i\right)^2 + \left(y_{k'} - y_{k'}^i\right)^2};$$

$$\left(x_{k'}^i, y_{k'}^i\right)$$

is the projection coordinates of the points on the GIS road network topology corresponding to the lane i that is the shortest distance from the vehicle positioning point k', and $(x_{k'}, y_{k'})$ is the projection coordinates of the vehicle positioning point k';

in the step S43, according to the characteristic that the possibility of vehicle lane changing is smaller when the angle difference between the vehicle trajectory formed by the vehicle positioning points and the lane line shape is larger, a Gaussian distribution model is used for fitting to identify the possibility of vehicle lane changing;

the probability $$pc_{k'}^{i}$$

of not changing lanes when the vehicle positioning point k' is on the lane i is represented as:

$$pc_{k'}^{i}=1-\frac{1}{\sqrt{2\pi\lambda^2}}e^{-\frac{\theta_{k'}^{i}}{2\lambda^2}};$$

the angle between the vector formed by the current vehicle positioning point k' and the previous vehicle positioning point i and the line shape of the lane $$\theta_{k'}^{i}$$

is represented:

$$\theta_{k'}^{i}=\arccos\left(\frac{(x_{k'}-x_{k'-1},\ y_{k'}-y_{k'-1})\cdot(x_{k'}^{*}-x_{k'-1}^{*},\ y_{k'}^{*}-y_{k'-1}^{*})}{\sqrt{(x_{k'}-x_{k'-1})^2+(y_{k'}-y_{k'-1})^2}\sqrt{(x_{k'}^{*}-x_{k'-1}^{*})^2+(y_{k'}^{*}-y_{k'-1}^{*})^2}}\right);$$

$(x_{k-1}, y_{k-1})$ is the projection coordinates of the previous point of the vehicle positioning point k', $(x_k^*, y_k^*)$ is the point with the shortest distance from the vehicle positioning point k' on the current lane GIS road network topology to the projection coordinates $(x_k, y_k)$ of the vehicle positioning point k', $(x_{k-1}^*, y_{k-1}^*)$ is the point with the shortest distance from the vehicle positioning point k' on the current lane GIS road network topology to the previous projection coordinates $(x_{k-1}, y_{k-1})$ of the vehicle positioning point k', and $\lambda^2$ is the model parameter, which is estimated and obtained by using the moment estimation method based on historical data;

the probability of vehicle lane changing is calculated according to the fact that the greater the distance between different lanes, the smaller the possibility of vehicle lane changing;

the probability $$pc_{k'}^{i,v}$$

of the vehicle changing from lane i to lane v is represented as:

$$pc_{k'}^{i,v}=\frac{d^{i,v}}{\sum_{v=1}^{s'}d^{i,v}}*\frac{1}{\sqrt{2\pi\lambda^2}}e^{-\frac{\theta_{k'}^{i}}{2\lambda^2}},\ v\neq i;$$

$d^{i,v}$ is the distance between the lane i and the lane v;

a multi-modal lane changing probability model $$g_{k'}^{i,v}$$

of vehicle positioning points in the vehicle positioning data is obtained by integration $$g_{k'}^{i,v}=\begin{cases}1-\frac{1}{\sqrt{2\pi\lambda^2}}e^{-\frac{\theta}{2\lambda^2}}, & v=i\\ \frac{d^{i,v}}{\sum_{v=1}^{s'}d^{i,v}}*\frac{1}{\sqrt{2\pi\lambda^2}}e^{-\frac{\theta}{2\lambda^2}}, & v\neq i\end{cases};$$

when v=i, the vehicle does not change the lane, and when v≠i, the vehicle changes the lane;

in the step S44, each vehicle positioning data point is matched with the lane, the goal is to maximize the sum of the possibility scores of lane positioning points in the lanes and the probability of the vehicle lane changing during the driving process of the vehicle, and a global optimal matching model of the vehicle positioning data and the lanes of the section where the bridge is located is established;

the optimal matching model f of the vehicle positioning data and the lanes of the section where the bridge is located is represented as:

$$f=\max\left(\sum_{j=1}^{N}p_q^i g_q^{i,v}\right);$$

$$p_q^i$$

is the probability that the vehicle is in lane i, $$g_q^{i,v}$$

is the probability that the vehicle changes from lane i to lane v, N is the number of positioning points of the vehicle on the section where the bridge is located, and q is the vehicle positioning point;

the constraint condition 1 is lane change constraint, the vehicle lane changing is constrained in the matching process, whether the lane change directions of each lane of the bridge meets the number of lanes of the bridge is judged, the lane $h(bl_i, \alpha')$ where the vehicle is located after the lane $bl_i$ changes in the lane changing direction α' is obtained, and if there is no corresponding lane on the bridge after changing lanes in the lane changing direction a', it is represented as 0;

the lane change constraint can be represented as:

$$h(bl_i, a')\neq 0;$$

the constraint condition 2 is vehicle position constraint, the vehicle position conflicts at the same moment are constrained, the positioning data of vehicles on the section where the bridge is located is matched according to the sampling frequency of vehicle positioning data as the priority, at the same moment, the matching position of the vehicle positioning point which is not matched does not conflict with the position of the vehicle which is matched previously, that is, the error between the matching position of the vehicle positioning point combined with the lane length occupied by the vehicle length and the point position of the previously matched vehicle combined with the lane length occupied by the vehicle length at the same moment should be less than a set error value, the coordinates of the to-be-matched vehicle positioning point k' are ($bx_{k'}$, $by_{k'}$), the point with the shortest distance from the vehicle positioning point k' to the GIS road network topology matched with lane i is $$(gbx^i_{u'}, gby^i_{u'}),$$

the vehicle length corresponding to the vehicle positioning point k' is $vl_{k'}$, the coordinates of the matched vehicle positioning point q at the same moment as the vehicle positioning point k' are ($hx_q$, $hy_q$), the point with the shortest distance from the vehicle positioning point q to the GIS road network topology matched with lane i is $$(ghx^i_{v'}, ghy^i_{v'}),$$

and the vehicle length is $vl_q$, and the allowable position conflict error is $\chi$;

the vehicle position constraint is represented as:

$$\sqrt{(gbx^i_{u'} - ghx^i_{v'})^2 + (gby^i_{u'} - ghy^i_{v'})^2} - \frac{vl_{k'} + v_q}{2} \le \chi;$$

in the step S45, according to the constructed vehicle positioning sequence set $S_{r'}$ with different matching priorities, the optimal matching model is solved in the order of the sequence to obtain the matching results of vehicle positioning points with different sampling frequencies, including the matched lane number and the coordinate point closest to the vehicle positioning point on the matched lane GIS road network topology, and the coordinate point closest to the vehicle positioning point on the matched lane GIS road network topology is integrated into the point set S" for vehicle trajectory correction $$S'' = \{S''_1, S''_2, \ldots, S''_{r''}\};$$

specifically, after vehicle positioning data of sections where bridge travelings in a bridge group are located is obtained, driving trajectories of vehicles on different lanes of the bridge are required to be obtained, vehicle trajectory data are provided for identifying spatial-temporal load distribution of vehicles on the bridge deck, and the driving trajectories of the vehicles on different lanes of the bridge are obtained by matching the vehicle positioning data of different sampling frequencies with lane-level GIS topological data of the sections where the bridges are located; since the sampling frequencies of different types of vehicle positioning data are different, the more accurate the features of the vehicle positioning data with higher frequencies are extracted, the more accurate the lane changing behavior identification and the vehicle trajectory matching are performed, the sampling frequency is used as the basis for the priority identification of vehicle positioning data, and the higher the sampling frequency, the greater the priority of vehicle positioning data matching; meanwhile, there may be conflicts in the matching positions of different vehicles at the same moment, according to the matching priority of vehicle positioning data, conflicts in matching positions of different vehicles and vehicle lane changing, a vehicle positioning optimization matching model based on matching priority is established to achieve the matching of vehicle positioning data of different sampling frequencies with the lanes of the section where the bridge is located, and obtain the lanes corresponding to positioning points and the positions of the corresponding lanes.

Further, in the S51, for the bridge group, a lane-level traffic simulation road network is established by bridge travelings; and for a single bridge, according to the bridge design parameters, the bridge length, the entrance, the exit, lane width and lane length are obtained, and a lane-level traffic simulation road network model for the bridge deck is established with the bridge entrance as the start point and the bridge exit as the end point;

in the step S52, the matching results of the adjacent vehicle positioning data before and after vehicles enter the bridge are intercepted and sorted according to the sampling frequency to determine the priority, according to the positions of lanes at the bridge entrance, the data of two adjacent positioning points before and after vehicles enter the bridge entrance and the position of the matching result on the lane are obtained from the matching results of the positioning points and the lanes, the matching result set si of adjacent vehicle positioning point before and after vehicles enter the bridge is obtained by sorting according to the sampling frequency, si={$sv_1$, $sv_2$, . . . , $sv_{q'}$}, and q' is the number of vehicles in a selected time;

the matching result of vehicle positioning data on the section where the bridge group is located and lanes of GIS road network topology is obtained by adopting the optimal matching model for positioning points based on the matching priority, the matching result sets of adjacent vehicle positioning points before and after vehicles enter the bridge are processed in sequence, and the corresponding vehicle model and vehicle length are obtained according to the vehicle positioning data;

for the bridge traveling line shape, according to the set spatial-temporal sampling frequency, the GIS road network topology data of lane line shapes of the section where the bridge is located is divided into a plurality of discrete points, and the GIS road network topology data point set $Gbx^i$ of lane line shapes of the section where the bridge is located is constructed, $$Gbx^i = \{gbx^i_1, gbx^i_2, \ldots, gbx^i_l\},$$

and l is the number of GIS road network topology data points of lane i;

according to the matching result set si of adjacent vehicle positioning points before and after vehicles enter the bridge, the generation information of the vehicle at the bridge entrance, i.e., the time, the speed and the lane of the single vehicle entering the bridge is calculated, the coordinates of the adjacent vehicle positioning points of a single vehicle before the bridge entrance are ($bx_{k'}'$, $by_{k'}'$), the coordinates of the adjacent vehicle positioning points of a single vehicle after the bridge entrance are ($bx_{k'+1}'$, $by_{k'+1}'$), the coordinates of the point on the matched lane GIS road network topology corresponding to the adjacent vehicle positioning points of a single vehicle before the bridge entrance are $$\left(gbx_{u'}^{i}, gby_{u'}^{i}\right),$$

the coordinates of the point on the matched lane GIS road network topology corresponding to the adjacent vehicle positioning points of a single vehicle after the bridge entrance are $$\left(gbx_{u'+c}^{v'}, gby_{u'+c}^{v'}\right),$$

the detection time of adjacent vehicle positioning points for a single vehicle before the bridge entrance is $t_{u'}$, the detection time of adjacent vehicle positioning points for a single vehicle after the bridge entrance is $t_{u'+c}$, c=1, 2, . . . n, the vehicle speed of the adjacent vehicle positioning points of a single vehicle before the bridge entrance is $$V_{u'}^{i},$$

the vehicle speed of the adjacent vehicle positioning points of a single vehicle after the bridge entrance is $$V_{u'+c}^{v},$$

the matching result point on the GIS road network topology of the lane at the bridge entrance is $$\left(gbx_{u'+b}^{i'}, gby_{u'+b}^{i'}\right) \text{ or } \left(gbx_{u'+b}^{v'}, gby_{u'+b}^{v'}\right), b < c;$$

when the vehicle positioning point matching results $$\left(gbx_{u'}^{i'}, gby_{u'}^{i'}\right) \text{ and } \left(gbx_{u'+c}^{v'}, gby_{u'+c}^{v'}\right)$$

are at the same lane, that is, i=v, the time when the vehicle enters the bridge is calculated;

the time $t_{u'+b}$ of the vehicle entering the bridge is represented as:

$$t_{u'+b} = t_{u'} + (t_{u'+c} - t_{u'}) * \frac{\sum_{k'=0}^{b-1} \sqrt{\left(gbx_{u'+k'+1}^{i} - ghx_{u'+k'}^{i}\right)^2 + \left(gby_{u'+k'+1}^{i} - ghy_{u'+k'}^{i}\right)^2}}{\sum_{k'=0}^{c-1} \sqrt{\left(gbx_{u'+k'+1}^{i} - ghx_{u'+k'}^{i}\right)^2 + \left(gby_{u'+k'+1}^{i} - ghy_{u'+k'}^{i}\right)^2}};$$

when the vehicle positioning point matching results $$\left(gbx_{u'}^{i'}, gby_{u'}^{i'}\right), \text{ and } \left(gbx_{u'+c}^{v'}, gby_{u'+c}^{v'}\right),$$

are in different lanes, that is, i≠0, the lane matched with the vehicle positioning point with the shortest distance to the bridge entrance is used as the lane for the vehicle to enter the bridge, and when the vehicle positioning point with the shortest distance to the bridge entrance is $$\left(gbx_{u'}^{i'}, gby_{u'}^{i'}\right),$$

the time of the vehicle entering the bridge is $t_{u'+b}$;

when the vehicle positioning point with the shortest distance to the bridge entrance is $$\left(gbx_{u'+c}^{v'}, gby_{u'+c}^{v'}\right),$$

the time of the vehicle entering the bridge is $t_{u'+b}'$;

the time $t_{u'+b}'$ of the vehicle entering the bridge is represented as:

$$t_{u'+b'} = t_{u'} + (t_{u'+c} - t_{u'}) * \left(1 - \frac{\sum_{k'=0}^{c-b+1} \sqrt{\left(gbx_{u'+k'+1}^{i} - ghx_{u'+k'}^{i}\right)^2 + \left(gby_{u'+k'+1}^{i} - ghy_{u'+k'}^{i}\right)^2}}{\sum_{k'=0}^{c-1} \sqrt{\left(gbx_{u'+k'+1}^{i} - ghx_{u'+k'}^{i}\right)^2 + \left(gby_{u'+k'+1}^{i} - ghy_{u'+k'}^{i}\right)^2}}\right);$$

according to the vehicle speed $$V_{u}^{v}$$

when the vehicle positioning point is $$\left(gbx_{u'}^{i'}, gby_{u'}^{i'}\right)$$

and the vehicle speed $$V_{u+c}^{v}$$

when the vehicle positioning point is $$\left(gbx^{v'}_{u'+c}, gby^{i'}_{u'+c}\right),$$

the average speed V' of the vehicle when entering the bridge is obtained;

the average speed V' of the vehicle when entering the bridge is represented as:

$$V' = \frac{V^{v}_{u} + V^{v}_{u+c}}{2};$$

the time and lane of the vehicle entering the bridge are corrected, when the time and lane of two vehicles entering the bridge conflict, that is, vehicle positioning point $$\left(gbx^{i'}_{u'}, gby^{i'}_{u'}\right)$$

and vehicle positioning point $$\left(gbx^{v'}_{u'+c}, gby^{v'}_{u'+c}\right)$$

are at the same lane, i=v, the vehicle speed is corrected by correcting parameter d and then the time of the vehicle entering the bridge is corrected until the lanes do not conflict, and the corrected speed and the corrected time when the vehicle enters the bridge are obtained;

the corrected speed V" is represented as:

$$V'' = \frac{V^{i}_{u'} + dV^{i}_{u'+c}}{1+d}, d = 1, 2, \ldots \infty;$$

the corrected time when the vehicle enters the bridge is represented as:

$$t_{u'+b''} = t_{u'} + \frac{\sum_{k'=0}^{b-1} \left(gbx^{i}_{u'+k'+1} - ghx^{i}_{u'+k'}\right)^2 + \left(gby^{i}_{u'+k'+1} - ghy^{i}_{u'+k'}\right)^2}{V''};$$

when the vehicle positioning point $$\left(gbx^{i'}_{u'}, gby^{i'}_{u'}\right)$$

and the vehicle positioning point $$\left(gbx^{v'}_{u'+c}, gby^{v'}_{u'+c}\right)$$

are at different lanes, i≠v, the vehicle position conflict is solved by modifying the lane where the current vehicle is located, and when there is a time or lane conflict after lane modification, the vehicle position conflict is resolved by correcting the time to enter the bridge;

in the step S53, based on the optimal matching model of the vehicle positioning data with matching priority and the lanes of the section where the bridge is located, the matching result of the vehicle positioning data and lanes in the section where the bridge in the single-travel direction is located, and according to the position of the bridge on the section, the driving trajectories of the vehicle on the lanes on a bridge deck are obtained as the driving path input of the vehicle in the lane-level road network simulation model, and the model parameters include a simulation step, a vehicle following model and a vehicle lane changing model; and in the step S54, the generated information of the vehicles at the bridge entrance and the vehicle trajectories of the vehicles in the lanes are input into a bridge lane-level road network simulation model, the simulation is run, and the lanes and the longitudinal positions of the vehicles on the bridge at different moments, i.e., the spatial-temporal distribution of the vehicles on the bridge deck, are output, and the spatial-temporal distribution of the vehicles on the bridge deck is obtained by integration;

specifically, after the matching result of vehicle positioning data of the section where each bridge traveling in a bridge group is located is obtained, only vehicle trajectories of all vehicles on the section where the bridge traveling is located can be obtained; since different vehicle positioning data have different sampling frequencies, positions of all vehicles on the lanes of a bridge deck at different moments cannot be obtained, and there are problems that sampling time points of all vehicle positioning data are inconsistent and the number of vehicle positioning points of different vehicles is different, so that a spatial-temporal distribution identification model for vehicles on the bridge deck is established based on a microscopic traffic simulation model for obtaining real spatial-temporal distribution of vehicles on the bridge deck; in the microscopic traffic simulation model, a single vehicle in a road network is taken as a research object, the main research focuses on the influence of real follow-up, lane change, overtaking and other microscopic behaviors between vehicles in a road on the traffic capacity of the road network, which can dynamically simulate the real situation that the vehicle performs different microscopic behaviors under different road and traffic conditions, the microscopic traffic simulation model mainly outputs the instantaneous speed of each vehicle and the position of the vehicle in the road network, and mainly includes a road network construction module, a vehicle generation module, a signal control module, a vehicle following module and a vehicle lane changing module; and the spatial-temporal distribution identification model for vehicles on the bridge deck improves the vehicle generation module of the microscopic traffic simulation model based on vehicle positioning data with different sampling frequencies, and can obtain the time and speed of vehicles entering the bridge, which is closer to the actual time and speed of vehicles entering the bridge.

Further, the simulation step is obtained according to the time interval of the spatial-temporal distribution of the vehicles on the bridge deck, the vehicle following model is a Wiedemann following model, and the lane changing model is a rule-based model;

specifically, the present application can select different time intervals for the spatial-temporal distribution of vehicles on the bridge deck according to actual requirements. In this embodiment, the time interval for the spatial-temporal distribution of vehicles on the bridge deck is set to be 0.2 in s, the set spatial-temporal sampling frequency is that one point is collected every 0.25 m, the bridge line shape is divided into a plurality of points, and the position of a bridge GIS matched with the vehicle positioning points and the time for entering the bridge are found.

Although the present application has been described based on a limited number of embodiments, those skilled in the art, having benefit of the foregoing description, will appreciate that other embodiments can be envisioned within the scope of the present application described herein. In addition, it should be noted that the language used in this specification is primarily selected for readability and teaching purposes, and is not selected for the purpose of explaining or limiting the subject matter of the present application. Therefore, many modifications and variations will be apparent to those of ordinary skill in the art without departing from the scope and spirit of the appended claims. The disclosure made in the present application is intended to be illustrative rather than limiting of the scope of the present application, and the scope of the present application is defined by the appended claims.

What is claimed is:

1. A method for identifying the spatial-temporal load distribution of a bridge group based on multi-source data fusion, comprising the following steps:

S1. performing GIS topological network matching on a vehicle based on vehicle positioning data to obtain vehicle trajectory data;

S11. selecting vehicle load detection points in an area, and extracting and collecting vehicle load detection data and vehicle positioning data; wherein the vehicle load detection points comprise an overload control point, a source overload control detection point, a high-speed weight toll detection point and a bridge dynamic weighing detection point, vehicle load detection data and vehicle positioning data in the same selected time are selected in a selected area, the vehicle load detection data comprises a license plate number, detection time, a vehicle load and an ID, a longitude and a latitude of a section where the vehicle load is located, and the vehicle positioning data comprise a vehicle length, a vehicle model, a vehicle type, a license plate number, time, a driving speed and longitude and latitude coordinates;

S12. preprocessing the vehicle positioning data, and collecting GIS topological network section information of a road network;

S13. collecting bridge group information, and matching the vehicle positioning data with the GIS topological network section information;

S14. according to the GIS topological network section information, obtaining vehicle positioning data matched with bridge traveling sections in the bridge group to form vehicle trajectory data;

S2. segmenting the vehicle trajectory based on the vehicle load detection points, and obtaining a path segment where the bridge is located in combination with the section where the bridge is located;

S21. dividing all vehicle trajectories into a plurality of path subsegments according to the ID of the section where the vehicle load detection points are located;

S22. extracting path subsegments where bridge travelings of each bridge in the bridge group are located according to a section where the bridge traveling in bridge group information is located;

S3. according to the vehicle positioning data and vehicle load data, identifying vehicle loads matched with start points and end points of traveling path segments of each bridge in the bridge group, and calculating an actual vehicle load passing through the bridge;

S31. respectively identifying a start point vehicle load detection point and an end point vehicle load detection point corresponding to a vehicle entering segment and a vehicle exiting segment of each path subsegment of vehicle load segment sets matched with bridge travelings, and calculating detection time and vehicle load passing through the start point vehicle load detection point and the end point vehicle load detection point;

S32. selecting a specific vehicle load detection point, and calculating predicted time of the specific vehicle load detection point, predicted time of the vehicle passing through the start point vehicle load detection point and predicted time of the vehicle passing through the end point vehicle load detection point based on the vehicle positioning data;

S33. matching the vehicle positioning data with vehicle load data of a load segment, and obtaining the actual vehicle load, wherein the load segment is a segment from the start point vehicle load detection point to the end point vehicle load detection point;

S4. according to the vehicle positioning data and vehicle load detection point detection data, identifying the vehicle loads matched with the start points and the end points of the bridge traveling path segments, and obtaining the vehicle loads passing through the bridge;

S41. selecting vehicle positioning data of a section where the bridge traveling direction is located, and constructing a lane-level GIS topological network of the section where the bridge traveling direction is located;

S42. determining a matching priority according to sampling frequency, constructing a vehicle positioning sequence set with different matching priorities for the vehicle positioning data of the section where the bridge traveling is located, and calculating possibility scores of vehicle positioning data points matching lanes;

S43. fitting by adopting a Gaussian distribution model, identifying a possibility of vehicle lane changing, calculating a probability of vehicle lane changing, and constructing a multi-mode vehicle lane changing probability model;

S44. constructing an optimal matching model between the vehicle positioning data based on the matching priority and the lanes of the section where the bridge is located according to constraint condition 1 and constraint condition 2; wherein the constraint condition 1 is lane change constraint, the vehicle lane changing is constrained in a matching process; the constraint condition 2 is vehicle position constraint, a vehicle position conflict at the same moment is constrained;

S45. performing lane matching on vehicle positioning according to different priorities, solving vehicle positioning point matching results of different sampling frequencies by adopting the optimal matching model, and integrating to obtain a point set for vehicle trajectory correction;

S46. performing lane matching on the vehicle positioning data of the sections where bridge travelings of each bridge in the bridge group are located, and obtaining a matching result of the vehicle positioning data of the sections where bridge travelings are located;

S5. obtaining the spatial-temporal distribution of the vehicles on the bridge deck based on a bridge group lane-level road network simulation model;

S51. constructing the bridge group lane-level road network simulation model based on bridge design parameters and a microscopic traffic simulation model;

S52. obtaining a matching result of vehicle positioning data on the section where the bridge group is located and lanes of GIS road network topology by adopting the optimal matching model for positioning points based on the matching priority, calculating time and speed of a single vehicle entering the bridge, and correcting position conflicts of the vehicles;

S53. extracting a driving path of the vehicle on the bridge deck according to the matching result, and setting simulation model parameters in a bridge lane-level road network simulation model;

S54. running the lane-level road network simulation model to obtain the spatial-temporal distribution of vehicles, simulating each bridge in the bridge group, and integrating the spatial-temporal distribution of the vehicles on all the bridges in the bridge group to obtain the spatial-temporal distribution of the vehicles on the bridge deck; and S6. matching the vehicle load of the vehicle passing through the bridge with the spatial-temporal distribution of the vehicles on the bridge deck by the vehicle positioning data to obtain the spatial-temporal distribution of the loads of each bridge in the bridge group, and integrating to obtain the spatial-temporal distribution of the loads of the bridge group.

2. The method for identifying the spatial-temporal load distribution of the bridge group based on multi-source data fusion according to claim 1, wherein in the S12, the vehicle positioning data preprocessing comprises missing value processing, error data processing and chronological ordering processing, and the GIS topological network section information comprises section name, section ID, section road grade, number of lanes on the section number and direction of the lane on the section;

in the S13, the bridge group is selected according to the selected area, the bridge group is represented as $$b,\ b=\{b_1^e, b_2^e, \ldots, b_k^e\},$$

wherein e is bridge traveling, k is the number of bridges, the bridge group is matched with the GIS topological network section information to obtain sections matched with the bridge group, the section set that matches the bridge group with the GIS topological network is represented as $$r,\ r=\left\{r_{b_1^e}, r_{b_2^e}, \ldots, r_{b_k^e}\right\},$$

the vehicle positioning data is matched with the information of each section in the GIS topological network by adopting a hidden Markov model to obtain the section matched with the vehicle positioning data, the section set that matches the vehicle positioning data of vehicle j with the road network GIS topology, the vehicle trajectory of vehicle j is represented as $re^j$, $re^j=\{r_1, r_2, \ldots, r_m\}$ wherein m is the number of sections that the vehicle passes through, the set of sections that match the vehicle positioning data with the GIS topological network, the complete vehicle trajectory is represented as re, $re=\{re^1, r^j, \ldots, re^p\}$, wherein p is the number of vehicles; and in the S14, the section set r that matches the bridge group with the GIS topological network is matched with the section set re that matches the vehicle positioning data with the GIS topological network to obtain the vehicle trajectory passing through the sections where bridge travelings in the bridge group are located.

3. The method for identifying the spatial-temporal load distribution of the bridge group based on multi-source data fusion according to claim 2, wherein in the S21, the vehicle load detection point information set is represented as ld, $ld=\{ld^1, ld^2, \ldots, ld^{r'}\}$; wherein r' is the number of load detection points, the complete vehicle trajectory re of each vehicle is divided into a plurality of path subsegments according to the ID of the section where the vehicle load detection point information set is located, the set of path subsegments after the vehicle trajectory $re^j$ of vehicle j is divided is represented as $$rs^j,\ rs^j=\left\{rs_1^j, rs_o^j, \ldots, rs_a^j\right\},$$

wherein α is the number of path subsegments of the vehicle trajectory, $$rs_o^j$$

is the $o^{th}$ path subsegment after the vehicle trajectory of vehicle j is divided, and the path subsegment division result of all vehicle trajectories is obtained by integration and represented as rs, $rs=\{rs^1, rs^j, \ldots, rs^p\}$, and a start point vehicle load detection point $ld_{start}$ corresponding to the start of the path subsegment of each vehicle trajectory and an end point vehicle load detection point $ld_{end}$ corresponding to the end are obtained; and in the S22, for the regional bridge group, the path subsegments where bridges in the bridge group are located are matched, according to the section set r that matches the bridge group with the GIS topological network and the path subsegment division result rs of all vehicle trajectories, the matching result i'=1,2, . . . , k of the path subsegment set $rs^j$ of the vehicle trajectory $re^j$ of the j and the bridge $$b_{i'}^e,$$

the set of vehicle load segments matched with the travelings of the bridge $$b_{i'}^e$$

is represented as $$b\_rs_{b_{i'}^e}^j,\ b\_rs_{b_{i'}^e}^j=\left\{rs_1^j, rs_2^j, \ldots, rs_c^j\right\},$$

wherein c is the number of times the vehicle j passes through the bridge traveling e within the selected time.

4. The method for identifying the spatial-temporal load distribution of the bridge group based on multi-source data fusion according to claim 3, wherein in the S31, the data corresponding to the start point vehicle load detection point $ld_{start}$ and the end point vehicle load detection point $ld_{end}$ are screened according to the license plate number, so as to obtain the vehicle load $$vl_{j'}^{start}$$

of the vehicle j passing through the start point vehicle load detection point, the detection time $$lt_{j'}^{start}$$

of the vehicle j passing through the start point vehicle load detection point, the vehicle load $$vl_{j'}^{end}$$

of the vehicle j passing through the end point vehicle load detection point, and the detection time $$lt_{j'}^{end}$$

of the vehicle j passing through the end point vehicle load detection point, wherein j' is the number of times the vehicle j passing through the vehicle load detection points;

in the step S32, the start point vehicle load detection point $ld_{start}$ or the end point vehicle load detection point $ld_{end}$ is selected and defined as a specific vehicle load detection point, the projection coordinates of the specific vehicle load detection point are represented as $(x_{ld}, y_{ld})$, the specific vehicle load detection point is u, the point coordinates of the data of a first vehicle positioning point matched with the GIS topological network before the specific vehicle load detection point are represented as $(x_u, y_u)$, the time of the data of a first vehicle positioning point matched with the GIS topological network before the specific vehicle load detection point is represented as $tp_u$, the speed of the data of a first vehicle positioning point data matched with the GIS topological network before the specific vehicle load detection point is represented as $v_u$, the point coordinates of the data of a first vehicle positioning point matched with the GIS topological network after the specific vehicle load detection point are represented as $(x_{u+1}, y_{u+1})$ the time of the data of a first vehicle positioning point matched with the GIS topological network after the specific vehicle load detection point is represented as $tp_{u+1}$, the speed of the data of a first vehicle positioning point data matched with the GIS topological network after the specific vehicle load detection point is represented as $v_{u+1}$, a and the predicted time of the vehicle passing through the specific vehicle load detection point is calculated;

the predicted time $t_{ld}$ of passing through the specific vehicle load detection point is represented as:

$$t_{ld} = tp_u + \frac{\sqrt{(x_{ld}-x_u)^2+(y_{ld}-y_u)^2}\,(t_{u+1}-t_u)}{\sqrt{(x_{ld}-x_u)^2+(y_{ld}-y_u)^2}+\sqrt{(x_{u+1}-x_{ld})^2+(x_{u+1}-y_{ld})^2}};$$

the predicted time $$t_{ld}^{start}$$

of the vehicle passing through the start point vehicle load detection point and the predicted time $$t_{ld}^{end}$$

of the vehicle passing through the end point vehicle load detection point are obtained based on the predicted time $t_{ld}$ of the vehicle passing through the specific vehicle load detection point;

in the S33, an allowable error range between the predicted time $t_{ld}$ of passing through the specific vehicle load detection point and the actual time detected at the specific vehicle load detection point is set as $\delta_0$;

when the error δ between the predicted time of passing through the vehicle load detection point and the actual time detected at the specific vehicle load detection point is less than the allowable error range $\delta_0$, the expression is as follows:

$$ff = \underset{j'=1}{\overset{h}{\arg\min}} \frac{\left|t_{ld}^{start}-t_{j'}^{start}\right|+\left|t_{ld}^{end}-t_{j'}^{end}\right|}{2};$$

$$\frac{\left|t_{ld}^{start}-lt_{j'}^{start}\right|+\left|t_{ld}^{end}-lt_{j'}^{end}\right|}{2} \le \delta_0;$$

ff is the minimum average error between the predicted time of the start point vehicle load detection point and the predicted time of the end point vehicle load detection point, and h is the number of times the vehicle passes through the load segment;

the vehicle loads and time of the vehicle load detection points corresponding to load segments within all allowable error ranges are obtained and recorded as the vehicle load $$vl_u^{start*}$$

of the actual start point vehicle load detection point, the vehicle load $$vl_u^{end*}$$

of the actual end point vehicle load detection point, the detection time $$lt_u^{start*}$$

of the actual start point vehicle load detection point, and the detection time $$lt_k^{end*}$$

of the actual end point vehicle load detection point;

an actual vehicle load passing through the bridge is obtained according to the vehicle load $$vl_u^{start*}$$

of the actual start point vehicle load detection point and the vehicle load $$vl_u^{end*}$$

of the actual end point vehicle load detection point;

the actual vehicle load $vl_{b_i}$ is represented as:

$$vl_{b_i} = \frac{vl_u^{start*} + vl_u^{end*}}{2}.$$

5. The method for identifying the spatial-temporal load distribution of the bridge group based on multi-source data fusion according to claim 4, wherein in the S41, the vehicle positioning data of vehicles passing through the sections where bridge travelings in the bridge group are located is obtained, and a GIS road network topology is constructed with a section entrance where the bridge travel is located as a start point and a section exit where the bridge travel is located as an end point according to the number of lanes, the length of lanes, and GIS data of the sections where the bridge traveling directions are located;

in the S42, for the vehicle positioning data of the section where the single bridge traveling in the bridge group is located, the vehicle positioning data is sorted from high to low according to the sampling frequency, and a vehicle positioning sequence set S with different matching priorities is constructed, $S=\{S_1, S_2, \ldots, S_{r''}\}$, wherein r" is the number of vehicles passing through the single bridge traveling direction of the bridge;

the possibility of the vehicle positioning points on each lane is evaluated by adopting a Gaussian distribution function, and the set of the lanes of the section where the bridge is located is bl, $bl=\{bl_1, bl_2, \ldots, bl_{s'}\}$, wherein s' is the number of the lanes of the section where the bridge is located, the shortest distance from the vehicle positioning points to the GIS road network topology of the lanes and the possibility score of the vehicle positioning points in the lanes are calculated in the driving process of the same lane;

the possibility score $$p_{k'}^i$$

of the vehicle location pint k' in the lane i is represented as:

$$p_{k'}^i = \frac{1}{\sqrt{2\pi\delta^2}} e^{-\frac{d_{k'}^i}{2\delta^2}};$$

$\delta^2$ is the Gaussian model parameter, which is obtained by using the moment estimation parameter estimation method based on historical data, i=1,2, . . . , s';

the shortest distance $$d_{k'}^i,$$

between the vehicle positioning point k' and the GIS road network topology corresponding to the lane i is represented as:

$$d_{k'}^i = \sqrt{(x_{k'} - x_{k'}^i)^2 + (y_{k'} - y_{k'}^i)^2};$$

$$(x_{k'}^i, y_{k'}^i)$$

is the projection coordinates of the points on the GIS road network topology corresponding to the lane i that is the shortest distance from the vehicle positioning point k', and $(x_{k'}, y_{k'})$ is the projection coordinates of the vehicle positioning point k';

in the step S43, according to the characteristic that the possibility of vehicle lane changing is smaller when the angle difference between the vehicle trajectory formed by the vehicle positioning points and the lane line shape is larger, a Gaussian distribution model is used for fitting to identify the possibility of vehicle lane changing;

the probability $$pc_{k'}^i$$

of not changing lanes when the vehicle positioning point k' is on the lane i is represented as:

$$pc_{k'}^i = 1 - \frac{1}{\sqrt{2\pi\lambda^2}} e^{-\frac{\theta_{k'}^i}{2\lambda^2}};$$

the angle between the vector formed by the current vehicle positioning point k' and the previous vehicle positioning point i and the line shape of the lane $$\theta_{k'}^i,$$

is represented:

$$\theta_{k'}^{i} = \arccos\left(\frac{(x_{k'}-x_{k'-1}, y_{k'}-y_{k'-1})\bullet(x_{k'}^{*}-x_{k'-1}^{*}, y_{k'}^{*}-y_{k'-1}^{*})}{\sqrt{(x_{k'}-x_{k'-1})^2+(y_{k'}-y_{k'-1})^2}\sqrt{(x_{k'}^{*}-x_{k'-1}^{*})^2+(y_{k'}^{*}-y_{k'-1}^{*})^2}}\right);$$

$(x_{k-1}, y_{k-1})$ is the projection coordinates of the previous point of the vehicle positioning point k', $(x_k^*, y_k^*)$ is the point with the shortest distance from the vehicle positioning point k' on the current lane GIS road network topology to the projection coordinates $(x_k, y_k)$ of the vehicle positioning point k' $(x_{k-1}^*, y_{k-1})$ is the point with the shortest distance from the vehicle positioning point k' on the current lane GIS road network topology to the previous projection coordinates $(x_{k-1}, y_{k-1})$ of the vehicle positioning point k', and $\lambda^2$ is the model parameter, which is estimated and obtained by using the moment estimation method based on historical data;

the probability of vehicle lane changing is calculated according to the fact that the greater the distance between different lanes, the smaller the possibility of vehicle lane changing;

the probability $$pc_{k'}^{i,v}$$

of the vehicle changing from lane i to lane v is represented as:

$$pc_{k'}^{i,v} = \frac{d^{i,v}}{\sum_{v=1}^{s'} d^{i,v}} * \frac{1}{\sqrt{2\pi\lambda^2}} e^{-\frac{\theta_{k'}^{i}}{2\lambda^2}}, v \neq i;$$

$d^{i,v}$ is the distance between the lane i and the lane v;

a multi-modal lane changing probability model $$g_{k'}^{i,v}$$

of vehicle positioning points in the vehicle positioning data is obtained by integration;

$$g_{k'}^{i,v} = \begin{cases} 1 - \frac{1}{\sqrt{2\pi\lambda^2}} e^{-\frac{\theta}{2\lambda^2}}, & v = i \\ \frac{d^{i,v}}{\sum_{v=1}^{s'} d^{i,v}} * \frac{1}{\sqrt{2\pi\lambda^2}} e^{-\frac{\theta}{2\lambda^2}}, & v \neq i \end{cases};$$

when v=i, the vehicle does not change the lane, and when v≠i, the vehicle changes the lane;

in the step S44, each vehicle positioning data point is matched with the lane, the goal is to maximize the sum of the possibility scores of lane positioning points in the lanes and the probability of the vehicle lane changing during the driving process of the vehicle, and a global optimal matching model of the vehicle positioning data and the lanes of the section where the bridge is located is established;

the optimal matching model f of the vehicle positioning data and the lanes of the section where the bridge is located is represented as:

$$f = \max\left(\sum_{j=1}^{N} p_q^i g_q^{i,v}\right)$$

$$p_q^i$$

is the probability that the vehicle is in lane $$i, g_q^{i,v}$$

is the probability that the vehicle changes from lane i to lane v, N is the number of positioning points of the vehicle on the section where the bridge is located, and q is the vehicle positioning point;

whether the lane change directions of each lane of the bridge meets the number of lanes of the bridge is judged, the lane $h(bl_i, \alpha')$ where the vehicle is located after the lane $bl_i$ changes in the lane changing direction $\alpha'$ is obtained, and if there is no corresponding lane on the bridge after changing lanes in the lane changing direction $\alpha'$, it is represented as 0;

the lane change constraint is represented as:

$$h(bl_i, a') \neq 0;$$

the positioning data of vehicles on the section where the bridge is located is matched according to the sampling frequency of vehicle positioning data as the priority, at the same moment, the matching position of the vehicle positioning point which is not matched does not conflict with the position of the vehicle which is matched previously in which, the error between the matching position of the vehicle positioning point combined with the lane length occupied by the vehicle length and the point position of the previously matched vehicle combined with the lane length occupied by the vehicle length at the same moment should be less than a set error value, the coordinates of the to-be-matched vehicle positioning point k' are $(bx_{k'}, by_{k'})$, the point with the shortest distance from the vehicle positioning point k' to the GIS road network topology matched with lane i is $$(gbx_{u'}^{i}, gby_{u'}^{i}),$$

the vehicle length corresponding to the vehicle positioning point k' is $vl_{k'}$, the coordinates of the matched vehicle positioning point q at the same moment as the vehicle positioning point k' are $(hx_q, hy_q)$, the point with the shortest distance from the vehicle positioning point q to the GIS road network topology matched with lane i is $$\left(gbx^{i}_{v'},\ gby^{i}_{v'}\right),$$

and the vehicle length is $vl_q$, and the allowable position conflict error is $\chi$;

the vehicle position constraint is represented as:

$$\sqrt{\left(gbx^{i}_{u'}-ghx^{i}_{v'}\right)^{2}+\left(gby^{i}_{u'}-ghy^{i}_{v'}\right)^{2}}-\frac{vl_{k'}+vl_{q}}{2}\le\chi;$$

in the step S45, according to the constructed vehicle positioning sequence set $S_{r'}$, with different matching priorities, the optimal matching model is solved in the order of the sequence to obtain the matching results of vehicle positioning points with different sampling frequencies, comprising the matched lane number and the coordinate point closest to the vehicle positioning point on the matched lane GIS road network topology, and the coordinate point closest to the vehicle positioning point on the matched lane GIS road network topology is integrated into the point set S" for vehicle trajectory correction $s''=\{S_1'', S_2'', \ldots, S_{r''}''\}$.

6. The method for identifying the spatial-temporal load distribution of the bridge group based on multi-source data fusion according to claim 5, wherein in the S51, for the bridge group, a lane-level traffic simulation road network is established by bridge travelings; and for a single bridge, according to the bridge design parameters, the bridge length, the entrance, the exit, lane width and lane length are obtained, and a lane-level traffic simulation road network model for the bridge deck is established with the bridge entrance as the start point and the bridge exit as the end point;

in the step S52, the matching results of the adjacent vehicle positioning data before and after vehicles enter the bridge are intercepted and sorted according to the sampling frequency to determine the priority, according to the positions of lanes at the bridge entrance, the data of two adjacent positioning points before and after vehicles enter the bridge entrance and the position of the matching result on the lane are obtained from the matching results of the positioning points and the lanes, the matching result set si of adjacent vehicle positioning point before and after vehicles enter the bridge is obtained by sorting according to the sampling frequency, $si=\{sv_1, sv_2, \ldots, sv_{q'}\}$, and q' is the number of vehicles in a selected time;

the matching result of vehicle positioning data on the section where the bridge group is located and lanes of GIS road network topology is obtained by adopting the optimal matching model for positioning points based on the matching priority, the matching result sets of adjacent vehicle positioning points before and after vehicles enter the bridge are processed in sequence, and the corresponding vehicle model and vehicle length are obtained according to the vehicle positioning data;

for the bridge traveling line shape, according to the set spatial-temporal sampling frequency, the GIS road network topology data of lane line shapes of the section where the bridge is located is divided into a plurality of discrete points, and the GIS road network topology data point set $Gbx^i$ of lane line shapes of the section where the bridge is located is constructed, $$Gbx^{i}=\left\{gbx^{i}_{1},\ gbx^{i}_{2},\ \ldots,\ gbx^{i}_{l}\right\},$$

and l is the number of GIS road network topology data points of lane i;

according to the matching result set si of adjacent vehicle positioning points before and after vehicles enter the bridge, the generation information of the vehicle at the bridge entrance is calculated, the coordinates of the adjacent vehicle positioning points of a single vehicle before the bridge entrance are ($b_{k'}$, $by_{k'}$'), the coordinates of the adjacent vehicle positioning points of a single vehicle after the bridge entrance are ($bx_{k+1'}$, $b_{y+1}$'), the coordinates of the point on the matched lane GIS road network topology corresponding to the adjacent vehicle positioning points of a single vehicle before the bridge entrance are $$\left(gbx^{i'}_{u'},\ gby^{i'}_{u'}\right),$$

the coordinates of the point on the matched lane GIS road network topology corresponding to the adjacent vehicle positioning points of a single vehicle after the bridge entrance are $$\left(gbx^{v'}_{u'+c},\ gby^{v'}_{u'+c}\right),$$

the detection time of adjacent vehicle positioning points for a single vehicle before the bridge entrance is $t_{u'}$, the detection time of adjacent vehicle positioning points for a single vehicle after the bridge entrance is $t_{u'+c}$, c=1,2, . . . n, the vehicle speed of the adjacent vehicle positioning points of a single vehicle before the bridge entrance is $$V^{i}_{u'},$$

the vehicle speed or the adjacent vehicle positioning points of a single vehicle after the bridge entrance is $$V^{v}_{u'+c},$$

the matching result point on the GIS road network topology of the lane at the bridge entrance is $$\left(gbx^{i'}_{u'+b},\ gby^{i'}_{u'+b}\right)\ \text{or}\ \left(gbx^{v'}_{u'+b},\ gby^{v'}_{u'+b}\right),\ b<c;$$

when the vehicle positioning point matching results $$\left(gbx^{i'}_{u'},\ gby^{i'}_{u'}\right)\ \text{and}\ \left(gbx^{v'}_{u'+c},\ gby^{v'}_{u'+c}\right)$$

are at the same lane, i=v, the time when the vehicle enters the bridge is calculated;

the time $t_{u'+b}$ of the vehicle entering the bridge is represented as:

$$t_{u'+b} = t_{u'} + (t_{u'+c} - t_{u'}) * \frac{\sum_{k'=0}^{b-1} \sqrt{\left(gbx^{i}_{u'+k'+1} - ghx^{i}_{u'+k'}\right)^2 + \left(gby^{i}_{u'+k'+1} - ghy^{i}_{u'+k'}\right)^2}}{\sum_{k'=0}^{c-1} \sqrt{\left(gbx^{i}_{u'+k'+1} - ghx^{i}_{u'+k'}\right)^2 + \left(gby^{i}_{u'+k'+1} - ghy^{i}_{u'+k'}\right)^2}};$$

when the vehicle positioning point matching results $$\left(gbx^{i'}_{u'}, gby^{i'}_{u'}\right) \text{ and } \left(gbx^{v'}_{u'+c}, gby^{v'}_{u'+c}\right)$$

are in different lanes, i≠v, the lane matched with the vehicle positioning point with the shortest distance to the bridge entrance is used as the lane for the vehicle to enter the bridge, and when the vehicle positioning point with the shortest distance to the bridge entrance is $$\left(gbx^{i'}_{u'}, gby^{i'}_{u'}\right),$$

the time of the vehicle entering the bride is $t_{u'+b}$;

when the vehicle positioning point with the shortest distance to the bridge entrance is $$\left(gbx^{v'}_{u'+c}, gby^{v'}_{u'+c}\right),$$

the time of the vehicle entering the bridge is $t_{u'+b}$;

the time $t_{u'+b}'$ of the vehicle entering the bridge is represented as:

$$t'_{u'+b} = t_{u'} + (t_{u'+c} - t_{u'}) * \left(1 - \frac{\sum_{k'=0}^{c-b+1} \sqrt{(gbx^{v}_{u'+k'+1} - ghx^{v}_{u'+k'})^2 + (gby^{v}_{u'+k'+1} - ghy^{v}_{u'+k'})^2}}{\sum_{k'=0}^{c-1} \sqrt{(gbx^{v}_{u'+k'+1} - ghx^{v}_{u'+k'})^2 + (gby^{v}_{u'+k'+1} - ghy^{v}_{u'+k'})^2}}\right);$$

according to the vehicle speed $$V^{v}_{u}$$

when the vehicle position point is $$\left(gbx^{i'}_{u'}, gby^{i'}_{u'}\right)$$

and the vehicle speed $$V^{v}_{u+c}$$

when the vehicle positioning point is $$\left(gbx^{v'}_{u'+c}, gby^{v'}_{u'+c}\right),$$

the average speed of V' of the vehicle when entering the bridge is obtained;

the average speed y' of the vehicle when entering the bridge is represented as:

$$V' = \frac{V^{v}_{u} + V^{v}_{u+c}}{2};$$

the time and lane of the vehicle entering the bridge are corrected, when the time and lane of two vehicles entering the bridge conflict in which vehicle positioning point $$\left(gbx^{i'}_{u'}, gby^{i'}_{u'}\right)$$

and vehicle positioning point $$\left(gbx^{v'}_{u'+c}, gby^{v'}_{u'+c}\right)$$

are at the same lane, i=v, the vehicle speed is corrected by correcting parameter d and then the time of the vehicle entering the bridge is corrected until the lanes do not conflict, and the corrected speed and the corrected time when the vehicle enters the bridge are obtained;

the corrected speed V' is represented as:

$$V'' = \frac{V^{i}_{u'} + dV^{i}_{u'+c}}{1+d}, \; d = 1, 2, \ldots \infty;$$

the corrected time when the vehicle enters the bridge is represented as:

$$t''_{u'+b} = t_{u'} + \frac{\sum_{k'=0}^{b-1} \sqrt{\left(gbx^{i}_{u'+k'+1} - ghx^{i}_{u'+k'}\right)^2 + \left(gby^{i}_{u'+k'+1} - ghy^{i}_{u'+k'}\right)^2}}{V''};$$

when the vehicle positioning point $$\left(gbx^{i'}_{u'}, gby^{i'}_{u'}\right)$$

and the vehicle positioning point $$\left(gbx^{v'}_{u'+c}, gby^{v'}_{u'+c}\right)$$

are at different lanes, i≠v, the vehicle position conflict is solved by modifying the lane where the current vehicle is located, and when there is a time or lane conflict after lane modification, the vehicle position conflict is resolved by correcting the time to enter the bridge;

in the step S53, based on the optimal matching model of the vehicle positioning data with matching priority and the lanes of the section where the bridge is located, the matching result of the vehicle positioning data and lanes in the section where the bridge in the single-travel direction is located, and according to the position of the bridge on the section, the driving trajectories of the vehicle on the lanes on a bridge deck are obtained as the driving path input of the vehicle in the lane-level road network simulation model, and the model parameters comprise a simulation step, a vehicle following model and a vehicle lane changing model; and in the step S54, the generated information of the vehicles at the bridge entrance and the vehicle trajectories of the vehicles in the lanes are input into a bridge lane-level road network simulation model, the simulation is run, and the lanes and the longitudinal positions of the vehicles on the bridge at different moments, and the spatial-temporal distribution of the vehicles on the bridge deck is obtained by integration.

7. The method for identifying the spatial-temporal load distribution of the bridge group based on multi-source data fusion according to claim 6, wherein the simulation step is obtained according to the time interval of the spatial-temporal distribution of the vehicles on the bridge deck, the vehicle following model is a Wiedemann following model, and the lane changing model is a rule-based model.

* * * * *